US012019963B2

(12) United States Patent
Roemerman et al.

(10) Patent No.: US 12,019,963 B2
(45) Date of Patent: Jun. 25, 2024

(54) OPERATIONS AND MAINTENANCE SYSTEMS AND METHODS EMPLOYING SENSOR-LESS DIGITAL TWINS

(71) Applicant: Incucomm, Inc., Addison, TX (US)

(72) Inventors: Steven D. Roemerman, Highland Village, TX (US); Eric Haney, Dallas, TX (US)

(73) Assignee: INCUCOMM, INC., Addison, TX (US)

( * ) Notice: Subject to any disclaimer, the term of this patent is extended or adjusted under 35 U.S.C. 154(b) by 994 days.

(21) Appl. No.: 16/947,555

(22) Filed: Aug. 6, 2020

(65) Prior Publication Data

US 2020/0394351 A1 Dec. 17, 2020

Related U.S. Application Data

(63) Continuation-in-part of application No. 16/270,338, filed on Feb. 7, 2019, now abandoned.
(Continued)

(51) Int. Cl.
*G06F 30/20* (2020.01)
*G06F 30/27* (2020.01)
(Continued)

(52) U.S. Cl.
CPC .......... *G06F 30/27* (2020.01); *G06N 20/00* (2019.01); *G06F 2111/08* (2020.01); *G06F 2111/18* (2020.01)

(58) Field of Classification Search
CPC .. G06F 30/27; G06F 2111/08; G06F 2111/18; G06N 20/00; G06N 20/20; G06Q 10/20
See application file for complete search history.

(56) References Cited

U.S. PATENT DOCUMENTS 9,354,813 B1 * 5/2016 Dolan ................... G06F 3/0647
10,423,884 B2 * 9/2019 Hyde ....................... G06N 7/01
(Continued)

FOREIGN PATENT DOCUMENTS

CN 110237530 A * 9/2019 ............. A63F 13/38
CN 111176224 A * 5/2020 ......... G05B 19/4184
(Continued)

*Primary Examiner* — Kandasamy Thangavelu
(74) *Attorney, Agent, or Firm* — Boisbrun Hofman, PLLC

(57) ABSTRACT

An operations and maintenance (O&M) system, and related method, for a plurality of unique objects characterized by distinct digital twins. The O&M system includes: a database subsystem for storing at least first and second distinct digital twins for each of the plurality of unique objects; at least one of the digital twins has an identifier that uniquely associates it with one of the plurality of unique objects and defines a unique virtual representation thereof. The system further includes a virtual sensor subsystem operative to emulate operational data for ones of the plurality of objects; the virtual sensor subsystem is not dependent on sensors physically associated with ones of the plurality of unique objects. A digital twin comparison subsystem is operative to compare outputs of the at least first and second distinct digital twins for each of the plurality of unique objects; the output of at least one of the first and second digital twins is a function of the emulated operational data for its associated object, and the O&M system makes an operational or maintenance decision with respect to an object as a function of the comparison.

49 Claims, 12 Drawing Sheets

Related U.S. Application Data

(60) Provisional application No. 62/883,490, filed on Aug. 6, 2019, provisional application No. 62/627,644, filed on Feb. 7, 2018.

(51) Int. Cl.
  *G06N 20/00* (2019.01)
  *G06F 111/08* (2020.01)
  *G06F 111/18* (2020.01)

(56) References Cited

U.S. PATENT DOCUMENTS

| | | | |
|---|---|---|---|
| 10,795,337 B2 * | 10/2020 | Bowers | G06N 5/022 |
| 2019/0156429 A1 * | 5/2019 | Beckmann | G06Q 20/3827 |
| 2019/0176862 A1 * | 6/2019 | Kumar | B61L 15/0081 |
| 2019/0266295 A1 * | 8/2019 | Masuda | G07C 5/008 |
| 2020/0186560 A1 * | 6/2020 | Ben-Noon | H04L 63/123 |
| 2020/0387147 A1 * | 12/2020 | Nixon | H04L 67/12 |
| 2021/0107538 A1 * | 4/2021 | Howard | G06N 5/01 |
| 2021/0139023 A1 * | 5/2021 | Crego | B60W 30/0956 |

FOREIGN PATENT DOCUMENTS

| | | | | |
|---|---|---|---|---|
| CN | 111220582 A | * | 6/2020 | G01N 21/91 |
| CN | 111344694 A | * | 6/2020 | G06F 16/24578 |
| WO | WO 2016030664 A1 | * | 3/2016 | G06Q 10/06 |
| WO | WO 2017178199 A1 | * | 10/2017 | B01D 53/9431 |
| WO | WO 2020049214 A1 | * | 3/2020 | F16K 31/1655 |

* cited by examiner

FIG. 15
FIG. 16-A
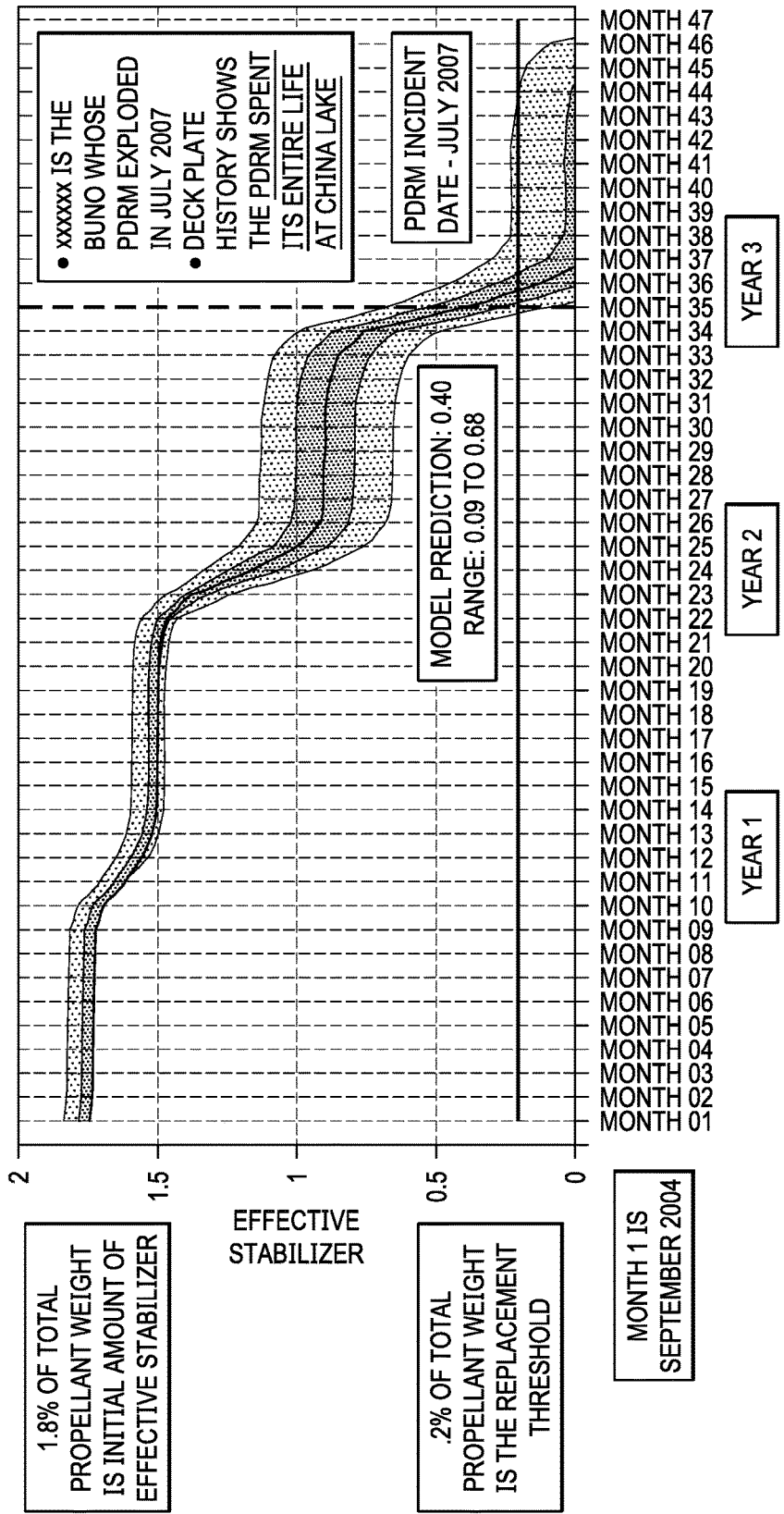

FIG. 16-B

FIGURE 19-A
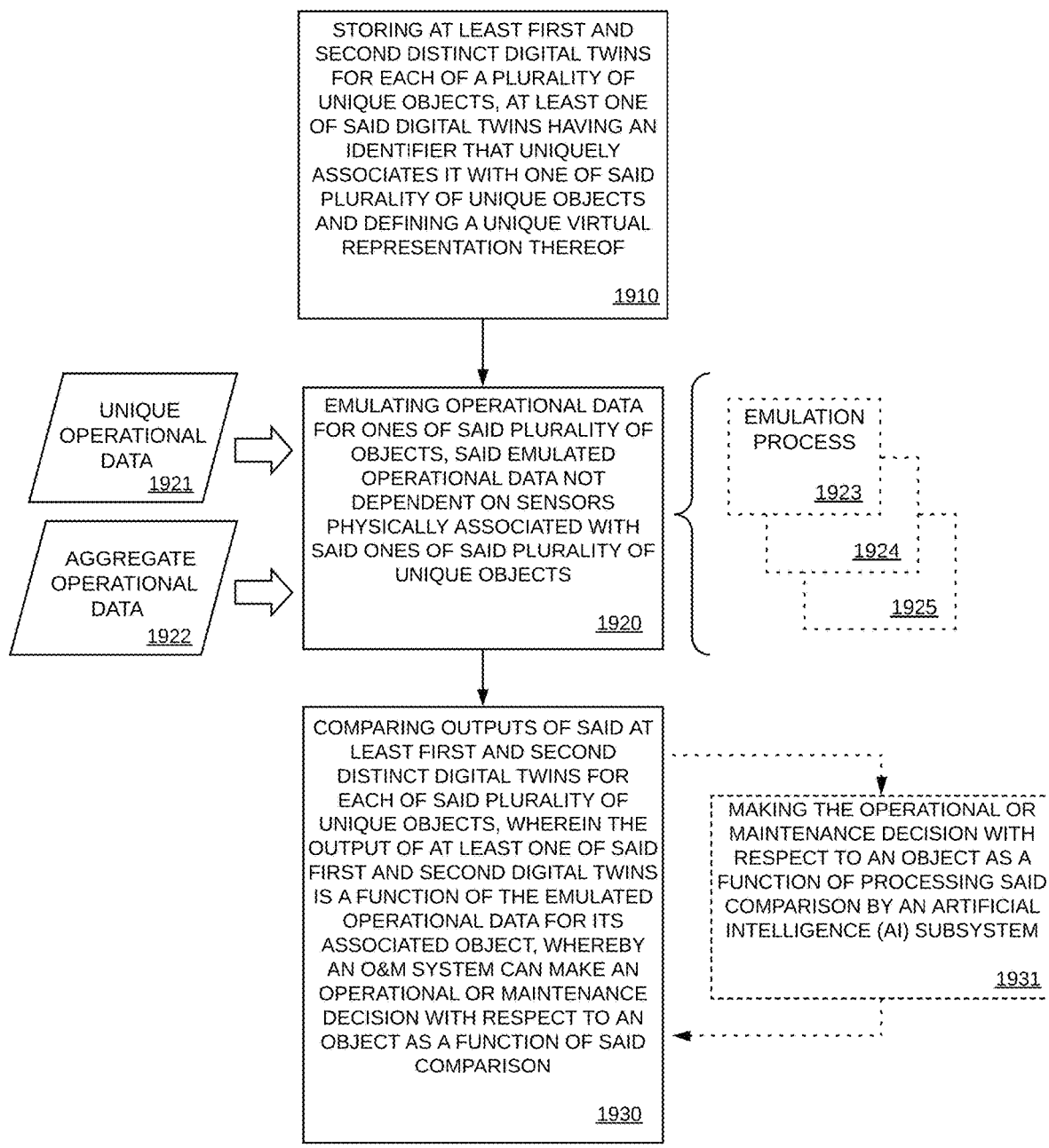

FIGURE 19-B
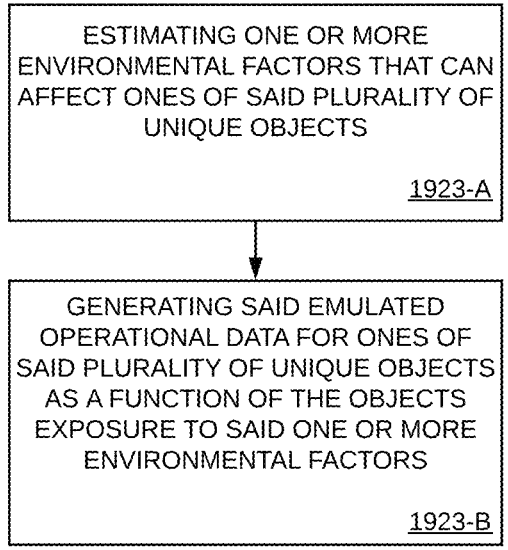
FIGURE 19-C
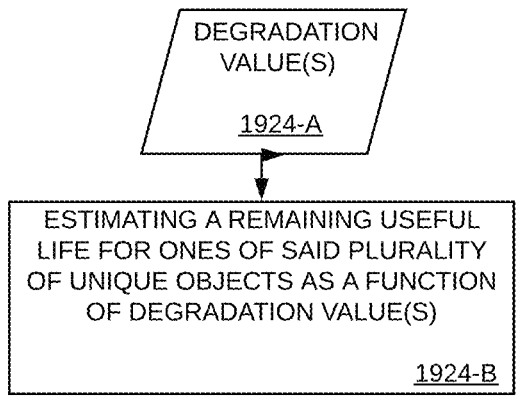
FIGURE 19-D
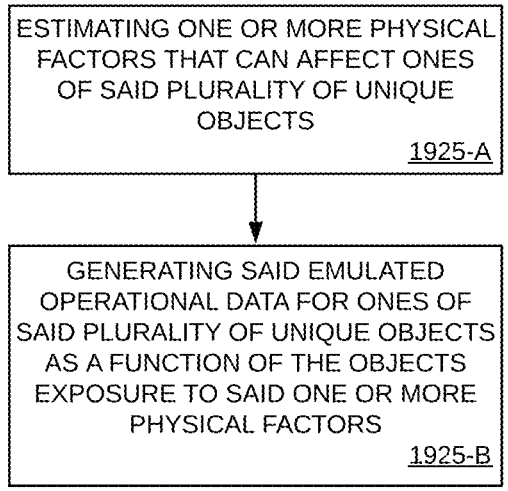

OPERATIONS AND MAINTENANCE SYSTEMS AND METHODS EMPLOYING SENSOR-LESS DIGITAL TWINS

RELATED APPLICATIONS

This application is a continuation-in-part of U.S. application Ser. No. 16/270,338, entitled "System And Method That Characterizes An Object Employing Virtual Representations Thereof", filed Feb. 7, 2019, which claims priority from U.S. Provisional Application No. 62/627,644, entitled "Digital Twins, Pairs, And Pluralities", filed Feb. 7, 2018, the disclosures of which are incorporated herein by reference. This application also claims priority to U.S. Provisional Application No. 62/883,490, entitled "Sensor-Less IoT Digital Twin", filed Aug. 6, 2019, the disclosure of which is incorporated herein by reference.

TECHNICAL FIELD

The inventions disclosed herein are directed, in general, to operations and maintenance (O&M) systems, and related methods, for objects having virtual representations ("digital twins") thereof; and, more particularly, to O&M systems and methods for sensor-less digital twins.

BACKGROUND

The term "digital twins" is generally attributed to Dr. Michael W. Grieves, at the University of Michigan sometime around 2001-2003. In a 2014 paper, Grieves states, "[t]he concept of a virtual, digital equivalent to a physical product or the digital twin was introduced in 2003 at my University of Michigan Executive Course on Product Lifecycle Management (PLM). At the time this concept was introduced, digital representations of actual physical products were relatively new and immature. In addition, the information being collected about the physical product as it was being produced was limited, manually collected, and mostly paper-based."

Since introducing the term, computational and networking capability has greatly expanded. Grieves and others have proposed new paradigms and methods to bridge the gulf between a physical product and the virtual product.

The term "digital twin" relates to the field of modeling, simulation, and analysis ("MS&A"). Practitioners of modeling, simulation, and analysis work across a vast array of academic disciplines and work in nearly every type of industry.

Because of this diversity, there is a lack of consensus on the meaning of many terms. For example, "model" can mean a digital program representing a physical system (a digital model of a missile). Some practitioners, however, use "model" to mean the mathematical representation, and "simulation" to mean the computer application that encodes the "model." Many other examples of semantic disagreement could be cited.

Therefore, a review of semantic usage and definition is advantageous, since the terms "model," "simulation," and "digital twin" are not used consistently, and an objective meaning might be difficult without such a review.

Although the term "digital twin" has become popular in the technology press, few patents have been awarded employing with the term. Example patents include U.S. Pat. No. 9,683,454 entitled "Method and System for Monitoring Non-Rotating Turbomachine Parts," and U.S. Pat. No. 9,671,777 entitled "Training Robots to Execute Actions in Physics-Based Virtual Environment," which are incorporated herein by reference. These both use narrow definitions of the term "digital twin," but different meanings are used in other publications.

Similarly, few patent applications use this term, and use definitions which are narrow, such as United States Patent Application Publication No. 2017/0108834, dealing with a human programming interface using digital twin principles. Another application using the term is United States Patent Application Publication No. 2017/0295057, which deals with customizing Industrial Internet of Things ("IoT") services and uses individual (not a plurality of) digital twins. The aforementioned publications and all publications cited herein are incorporated by reference.

Most other cases of "digital twin" with respect to patents fall into two categories. First, they relate to the computer representation of a mechanical object for the purposes of computer aided design ("CAD"), or for computer aided manufacturing ("CAM"), or for the combination of CAD/CAM, which is common in additive manufacturing. These are well aligned with the original definition of digital twin from Grieves.

The second category with respect to patents are cases where "digital" and "twin" appear together, but are both modifiers of some other term, as in "digital twin data channel." This second case deals with two digitized things which are duplicated, as in the redundant communications channel.

Most firms using the term as related to modeling, simulation, and analysis use narrow definitions, such as "a dynamic digital representation of an industrial asset" or "a data model of a real-world asset" or "an analytical model." Other definitions include the ability to render graphics representations of reality, or to create a representation of spatial reality, which both humans and computer systems can access. These spatial systems can involve a library of digital twins, but these are combined to create a single abstraction of reality. The firm Oracle uses a similar definition in marketing materials, stressing the information needed to create a thing, such as a three-dimensional model used for manufacturing, the information from observing data from a thing, captured during manufacturing, and from sensors during operation, and the aggregation of data from multiple things. Here too, one can see that Grieves' original ideas anchor the approach.

Note that most of these definitions assume deterministic information, and the tendency to assume a large database exists, with connectivity between the things being operated and some central processing and data storage location(s). In some cases, the term "model" refers to a rendering of the three-dimensional shape or some other visualization. In others, the "model" is a collection of static data about a thing.

Because of this emphasis on data bases and networking, many applications assume dependence on cloud computing as in U.S. Pat. No. 9,753,834, which is also incorporated herein by reference.

An emerging use of the term relies on machine learning to create the digital twin. By means of regression analysis, neural nets, or other means, some claim to be able to create a digital representation of the operational status of a thing, and the representation is called a "digital twin." A "digital twin" like other terms in modeling, simulation, and analysis requires specific definition to convey objective meaning. Two speakers or publications using the term may not mean the same thing.

Current practices are hindered by many important limitations. The teaching herein is not exhaustive, but illustrates some of the vexing problems with the approach. First, all these approaches described thus far assume there is a data connection to a computing facility with extensive processing and storage capacity. Because many important applications lack such connections, current approaches can struggle to make digital twins useful.

Second, all these approaches assume the connections are of sufficient bandwidth and latency to meet the operational needs of how things are deployed. Because many important applications lack such connections, current approaches can struggle to make digital twins useful.

Third, many of these approaches assume that information, such as part numbers, specify sufficient information to predict failures, to prescribe remediation, or to schedule maintenance. Detailed physical phenomena such as the breakdown of insulation or the degradation of a lubricant, however, are not obvious from a part number. Describing how an article is made is, in fact, detached from how things degrade. Creation, degradation, maintenance, and repair are separate activities, which are related, but distinct. Thus, some of these approaches are based on flawed assumptions.

Fourth, many of these approaches assume the original equipment manufacturer ("OEM") will establish and maintain the data base that embodies the digital twins. Users cannot rely on the OEM and the OEM is often not able to collect the information needed. Additionally, users want to enjoy the advantages of the Internet of Things ("IoT") and digital twins while employing things from multiple OEMs, whose approaches will surely differ. Further, a wide range of existing things would benefit from IoT and digital twin methods, but are too old to be of interest to the OEMs who ceased supporting them long ago. Thus, from an end-user perspective, independence from OEMs can be highly desirable.

Fifth, those digital twin approaches based on machine learning and artificial intelligence are highly computationally intensive, and nearly impossible to calibrate. Because failures are myriad, but rare, it can take years of data collection from things to collect sufficient observations to predict failures, much less prescribe root causes. Other uses of data associated with digital twins also suffer from this problem. This delay means long, expensive data-collection must precede the benefits, and in many cases, precludes any practical benefit. Therefore, time value of money principles imposes a heavy burden on these approaches, and to achieve a return on these approaches is difficult.

Sixth, rare and important events should yield critical data from IoT and digital twin implementations, but during many of these rare events (extreme weather, power outages, etc.) data collection is interrupted. Thus, any cloud-based approach using machine learning is at risk of being right 99 percent ("%") of the time when nothing interesting is happening; and being wrong the 1% of the time when value might be created.

Seventh, approaches based on machine learning and artificial intelligence alone are difficult for humans to understand. This creates too many problems to fully elaborate in this teaching. One problem is provable fairness. The European Union ("EU") General Data Protection Regulation requires an explanation of algorithms which use personal data. However, a neural net which chooses to decline to dispense cash at an automated teller machine ("ATM") is not explainable. A traffic camera that flags a car as suspicious, though no law has been broken, must somehow relate to explainable probable cause. A maintenance monitoring system that indicates failure can occur will be more credible, and human operators are more likely to act, if the root cause of the failure can be stated. This machine/human interface has critical legal and practical implications for the processing methods chosen for digital twins.

Eighth, approaches based on machine learning and artificial intelligence alone are often only able to predict failures and lack the ability to prescribe corrective actions. Since a symptom such as vibration could stem from many root causes, a system that notes vibration is growing and will soon cause a failure, is less valuable than a system that could distinguish among the many potential causes of the vibration. Because many of these root causes are rare, an artificial intelligence approach can never see enough combinations to be able to perform such diagnostics or provide a meaningful prescription.

Ninth, approaches based on machine learning and artificial intelligence alone require recalibration when new operational profiles, environments, or other changes occur. This imposes a high cost of ownership.

Tenth, approaches based on machine learning and artificial intelligence alone are unable to predict likely changes in operations and maintenance. For example, service intervals often change as equipment ages, and later service intervals can include replacements or inspections, which were unnecessary.

Eleventh, approaches based on machine learning and artificial intelligence alone are very vulnerable to the curse of dimensionality. This involves a dramatic increase in the number of computer operations required to perform a task as scale grows. An IoT process involving eight items each with eight sensors might seem to be about twice as complex as an IoT process with four items each having four sensors. In fact, it is far more likely the computational burden will grow exponentially. Schemes to avoid this challenge are generally called "dimensionality reduction." Such methods can work well in some fields, but for critical IoT applications, such reductions can mask critical information.

A further problem is that many devices or systems are deployed in large numbers, with each member of the population being used in unique ways and exposed to unique environments and stressors; this is particularly true for the ever-expanding universe of IoT devices. A digital twin of each member of the population is useful for estimating potential performance, predicting useful life, and prescribing maintenance interventions, among other applications of digital twins. The proliferation of devices and systems for which such insights are useful, however, has also been heretofore dependent on sensors associated with each such device or system to provide the necessary data, resulting in greater cost and system complexity.

SUMMARY

To address the deficiencies of the prior art described supra, disclosed herein is a new type of digital twin, and related systems and methods; in particular, systems and methods employing sensor-less digital twins. The claims are directed to an operations and maintenance (O&M) system, and related method, for a plurality of unique objects characterized by distinct digital twins. The O&M system includes: a database subsystem for storing at least first and second distinct digital twins for each of the plurality of unique objects; at least one of the digital twins has an identifier that uniquely associates it with one of the plurality of unique objects and defines a unique virtual representation thereof. The system further includes a virtual sensor subsystem operative to emulate operational data for ones of the plurality of objects; the virtual sensor subsystem is not dependent on sensors physically associated with ones of the plurality of unique objects. A digital twin comparison subsystem is operative to compare outputs of the at least first and second distinct digital twins for each of the plurality of unique objects; the output of at least one of the first and second digital twins is a function of the emulated operational data for its associated object, and the O&M system makes an operational or maintenance decision with respect to an object as a function of the comparison.

A virtual sensor subsystem can include an environmental profile module for estimating one or more environmental factors that can affect ones of the plurality of unique objects; and, an environmental response module for generating the emulated operational data for ones of the plurality of unique objects as a function of the objects exposure to the one or more environmental factors. An environmental profile module receives position and environmental data for ones of the plurality of unique objects, wherein position data defines one or more historical physical locations for an object and the environmental data comprises environmental measurements associated with each of the historical physical locations; the position and environmental data for an object can be obtained from one or more systems independent from the object. Alternatively, or in addition to an environmental profile module, the virtual sensor subsystem can include a physical profile module for estimating one or more physical factors that can affect ones of the plurality of unique objects; and, a physical response module for generating emulated operational data for ones of the plurality of unique objects as a function of the objects exposure to the one or more physical factors.

The emulated operational data can comprise, for example, one or more degradation values; in such embodiments, the virtual sensor subsystem can further include a useful life profile module for estimating a remaining useful life for ones of the plurality of unique objects as a function of each objects associated one or more degradation values. The emulated operational data can also be a function of an estimated rate of chemical reaction. For example, an estimated rate of chemical reaction can be based on the Arrhenius equation, $k=Ae^{-Ea/RT}$, wherein K is the rate constant, T is the absolute temperature, A is a known constant for the chemical reaction, Ea is the activation energy for the chemical reaction, and R is the universal gas constant.

In some embodiments, the virtual sensor subsystem stores unique operational data for each instance of an object. Alternatively, or in addition to such unique operational data, the virtual sensor subsystem can aggregate emulated operational data for similar ones of the plurality of unique objects. In such embodiments, the output of a digital twin can be a function of the aggregate emulated operational data for the similar ones of the plurality of unique objects. The operational or maintenance decision of the O&M system with respect to an object can also be a function of the aggregate emulated operational data for similar ones of the plurality of unique objects.

In alternative embodiments, the plurality of unique objects can be uniquely associated with a plurality of digital twin types, each digital twin type providing a different representation of an associated object. For example, a virtual representation associated with a digital twin can represent the normal functioning of an associated object, a failure mode of an associated object, or a maintenance schedule for an associated object.

The O&M system can be fully integrated or be comprised of independent subsystems; for example, one or more of the database subsystem, the virtual sensor subsystem, and the digital twin comparison subsystem can be physically hosted remotely from one or more of the plurality of unique objects. Furthermore, a digital twin can be associated with a sub-element of an associated object.

The decision of the O&M system with respect to an object can be based on a coherent comparison of the outputs of the first and second distinct digital twins associated with the object. Alternatively, the decision can be based on a weighted comparison of the outputs of the first and second distinct digital twins; in a related embodiment, the weighted comparison can be a function of confidence values associated with each of the distinct digital twins.

The O&M system can also include an artificial intelligence (AI) subsystem, wherein the O&M system makes the operational or maintenance decision with respect to an object as a function of processing the comparison by the AI subsystem. In such embodiments, the operational or maintenance decision with respect to an object can be a function of a deviation of the comparison from a nominal value; the nominal value can be variable as a function of historical operational data from one or more of the plurality of unique objects. Alternatively, the decision can be based on a deviation from a predicted value.

The foregoing has broadly outlined the essential and optional features of the various embodiments that will be described in detail hereinafter; the essential and certain optional features form the subject matter of the appended claims. Those skilled in the art should recognize that the principles of the specifically-disclosed systems and methods can be utilized as a basis for similar or functionally-equivalent systems and methods that may be within the scope of the appended claims.

BRIEF DESCRIPTION OF THE DRAWINGS

For a complete understanding of the present disclosure, reference is now made to the following detailed description taken in conjunction with the accompanying drawings, in which:

FIG. 15 illustrates an exemplary digital twin architecture that can employ sensor-less digital twins in a real-world application;

FIG. 16-B illustrates a second graph of predicted and actual test results for the exemplary digital twin architecture of FIG. 15;

Unless otherwise indicated, corresponding numerals and symbols in the various figures generally refer to corresponding parts or functions.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules associated with a system and method that employs a virtual representation of an object such as a physical object to determine a characteristic thereof. The system may create digital surrogates of a product during design, manufacturing and life-cycle use of the product, and coordinate a plurality of digital twins (or virtual representations) for applications including, without limitation, industrial systems, commercial systems, and consumer systems with a variety of distributed systems sharing disparate information.

A system will be described herein with respect to exemplary embodiments in a specific context, namely, a broad class of industrial systems and subsystems. The specific embodiments of industrial systems include, but are not limited to, product maintenance, representation of a product in a relational or artificial intelligence database, and simulation. The principles of the present invention are applicable to processes of support in many fields including, but not limited to, manufacturing, simulation, and product maintenance.

The Modeling Best Practices Benchmarking Project ("MBP2") defines "modeling" as "computer abstractions of reality." Usually this means mathematical representations, which may be called "simulation" or "computer forecasting." In some cases, it is called "big data" if it involves computer enabled analysis. It may be based on the "wisdom of crowds" and involve some form of computer-enabled or web-enabled group elicitation, or forecasting competition.

This definition includes static representations, such as the original states and parameters associated with an object when it was manufactured. These could include its weight, surface hardness, smoothness, reflectivity, hermiticity, center of gravity, clock speed, processing delay times, impedance, vibration levels when operating, measures of dynamical balances, and a myriad of other objective measures of performance or condition. This definition also includes many types of dynamic representations of the parameters and states of an object. Such dynamical representations come from sensor observations of the object, from operational simulations of the thing, or both.

Figure 1:
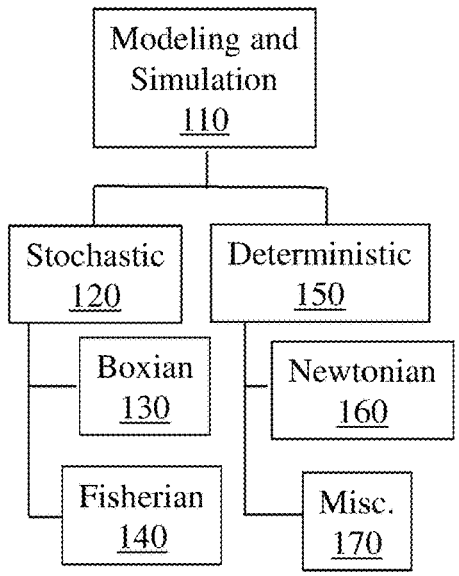
FIGS. 1 and 2 illustrate block diagrams of embodiments of a taxonomy from the Modeling Best Practices Benchmarking Project ("MBP2")

Referring initially to FIG. 1, illustrated is a block diagram of an embodiment of a taxonomy from the Modeling Best Practices Benchmarking Project ("MBP2"). The taxonomy includes a modeling, simulation, and analysis ("MS&A") taxonomy formed by a modeling and simulation subsystem 110. The modeling and simulation subsystem 110 includes a stochastic subsystem 120 and a deterministic subsystem 150. The stochastic subsystem 120 includes a Boxian subsystem 130 and a Fisherian subsystem 140. The deterministic subsystem 150 includes a Newtonian subsystem 160 and a miscellaneous subsystem 170.

A 2016 report on MBP2 research describes the deterministic branch of the taxonomy, as deterministic models work well for well-defined cause and effect problems, like physics based simulations. These can be called "Newtonian" but they include more than physics models. Any model which is based on deterministic representations and quantification by a single number fits into this class. Of course, some deterministic models are not representations of well-defined cause and effect relationships, but are modeled as such out of convenience or ignorance of better-suited approaches.

The report goes on to say, Fisherian models are based on statistical methods pioneered by R.A. Fisher who had to try to analyze genetics before DNA and chromosomes were understood—data with no cause-effect construct. This class of statistical model is still widely used in biology and medicine where large populations of individuals can be observed, but cause and effect are not well understood. Boxian models are based on the methods of G.E.P. Box and others (like Ronald A. Howard) who promote cause and effect based modeling of probabilistic problems. The distinction between direct statistical observation (Fisherian) and models guided by cause-effect relationships (Boxian) is important.

Figure 2:
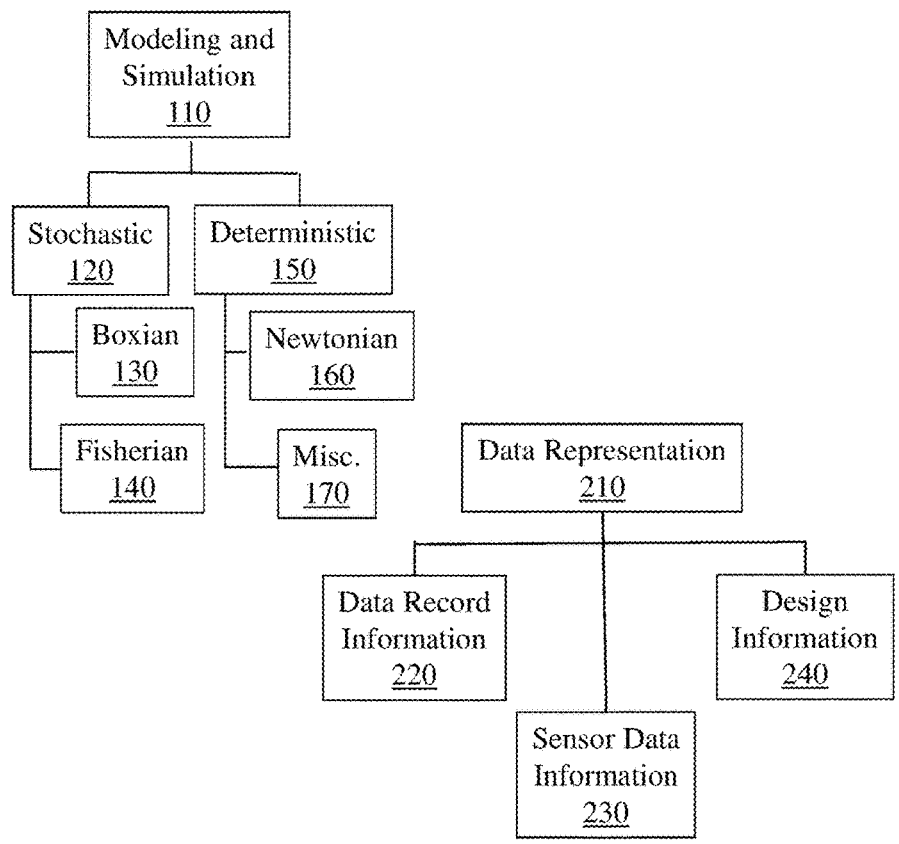

Turning now to FIG. 2, illustrated is a block diagram of an embodiment of a taxonomy from the Modeling Best Practices Benchmarking Project ("MBP2"). In addition to the modeling a simulation subsystem 110 introduced above with respect to FIG. 1, the taxonomy of FIG. 2 includes digital twin taxonomy formed with a data representation subsystem 210. The data representation subsystem 210 includes a data record information subsystem 220, a sensor data information subsystem 230 and a design information subsystem 230.

This taxonomy further includes the aspects of digital twins. For example, the concept of design information includes what Greives and others refer to as a digital twin prototype ("DTP"); the DTP records information employed to create an object. As an example, a DTP could contain a three-dimensional model of the objects, a bill of materials and a bill of processes describing how to create the object. A DTP relates to a family of similar objects.

The design information also includes the concept of a "reference design." A reference design may be even more generic than a DTP. A reference design might include all the characteristics of a generic object; for example, an electric motor connected to an impeller pump. The reference design could be generic enough to represent motor/pump pairs from several manufactures. It further embodies representations of failures, such as lubricant breakdown, insulation breakdown, bearing wear, and other root causes of failure and performance degradation.

The data record information includes the data related to a specific object(s). It includes measured data, and configuration data. The measured data includes parameters such as weight. The configuration data includes information such as part numbers. The term "record" refers to the fact that manufactures and maintainers usually record information about configuration and static parameters when an object is created or maintained.

The sensor data information includes observations from the operation of the object. The term "sensor" refers to the fact that data observed during operation comes from a sensor, even if the sensor is recorded by a human operator. The sensor data information and data record information span Grieves' definitions of digital twin instance ("DTI"), and digital twin aggregate ("DTA"), where the "instance" is information associated with one object, and "aggregate" is information associated with multiple objects.

Figure 3:
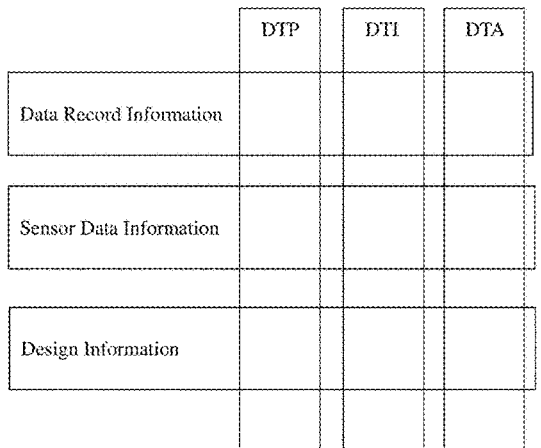
FIG. 3 illustrates a block diagram of an embodiment of a digital twin taxonomy comparison.

Turning now to FIG. 3, illustrated is a block diagram of an embodiment of a digital twin taxonomy comparison. The taxonomy is roughly orthogonal to Greives' definitions as seen in FIG. 3. In other words, the data record information, the sensor data information and the design information are roughly orthogonal to the DTP, DTI and DTA. Therefore, it should be clear the teaching described herein (e.g., a new digital twin ("NDT")) is more comprehensive than the paradigms of the prior art, and it will become clear that a wider number of system and methods of implementation arise from this approach.

Figure 4:
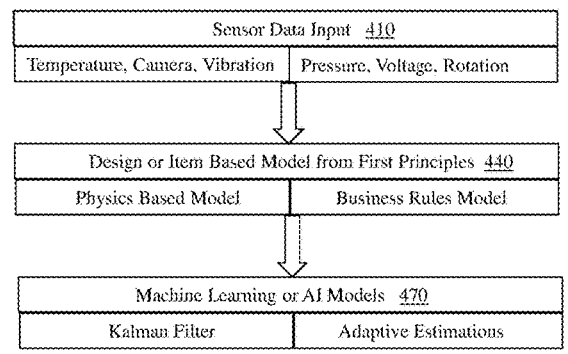
FIG. 4 illustrates a block diagram of an embodiment of a digital twin model.

Turning now to FIG. 4, illustrated is a block diagram of an embodiment of a digital twin model. The digital twin model includes a sensor data input subsystem 410 (including object parameters such as temperature, etc.) providing inputs to a design or item based model subsystem 440 (including, for instance, physics and business based models) and a machine learning or artificial intelligence ("AI") subsystem 470 (employing, for instance, a Kalman filter and adaptive estimations).

Of course, the artificial intelligence or machine learning are optional because many attributes are known. Some of these attributes are rarely manifested, and would use long learning or training periods for a pure artificial intelligence pure machine learning approach. Moreover, these attributes may embody dozens or even thousands of attributes. Thus, it will be apparent to those skilled in the art that such an approach greatly reduces the curse of dimensionality, and avoids a great many of the problems already enumerated.

The sensor data input subsystem 410 ingests sensor data for processing the data by the design or item based model subsystem 440, as well are stored information and predetermined information. The machine learning or artificial intelligence subsystem 470 can be used at a later stage of processing with adaptation, machine learning, and/or artificial intelligence. The details of the FIGURE are exemplary and not exhaustive. Note that connections may be more complex than shown in this simplified block diagram. For example, some sensor data may be provided to both the design or item based model subsystem 440 and the machine learning or artificial intelligence subsystem 470.

The design or item based model subsystem 440 is distinct from the digital twin approach described by Grieves and others. It is based on first principles. While having an original equipment manufacturer ("OEM") design information can be useful, such information is not necessary. Moreover, OEM data typically does not define end user processes, such as business rules. The design or item based model subsystem 440 is where dimensionality challenges are addressed, and it should be clear to those skilled in the art how this allocation of computational burden is beneficial.

From the perspective of model transparency, the digital twin provides a means to limit the scope of artificial intelligence or machine learning to narrow topics. This provides transparency which is not generally achievable with prior art. This also provides a means to ensure fair, non-discriminatory operations, which have been a challenge for prior methods.

The digital twin also provides an architectural approach to any the methods defined in FIG. 2 or 3. If the design or item based model subsystem 440 has reduced (e.g., minimal) influence, then the digital twin can rely on the machine learning or artificial intelligence subsystem 470.

Referring to FIG. 2, it should be clear that the digital twin can be designed using any of the architectural alternatives shown on the left side of the FIGURE including the Newtonian, Boxian, Fisherian, or miscellaneous (or other) subsystems 130, 140, 160, 170. Because of the need for transparency and, because most sensor data is noisy, there is great benefit to digital twins employing the Boxian subsystem 130. Further benefits of the Boxian subsystem 130 include compatibility with a wide range of adaptive and learning methods at the machine learning or artificial intelligence subsystem 470.

Figure 5:
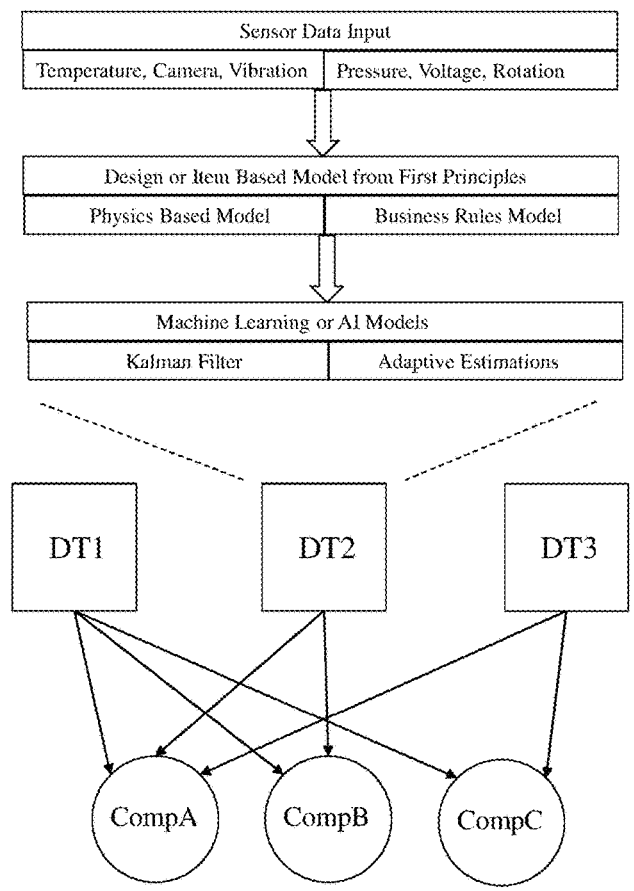
FIG. 5 illustrates a system level diagram demonstrating an embodiment of a comparison of a plurality of digital twins introduced with respect to FIG. 4.

Turning now to FIG. 5, illustrated is a system level diagram demonstrating an embodiment of a comparison of a plurality of digital twins (designated DT1, DT2, DT2) introduced with respect to FIG. 4. While the second digital twin DT2 is shown expanded with a digital twin model of FIG. 4, it should be understood that each digital twin can represent different approaches to representing the physical or real object. The first digital twin DT1 might represent acceptable functioning. The second digital twin DT2 might represent failure mechanisms only. The third digital twin DT3 might represent OEM guidance on maintenance schedules and other operating guidelines.

It is noted that the comparisons (designated CompA, CompB, CompC) may not be linearly related to the plurality of digital twins DT1, DT2, DT3. Any number of comparisons can be created. Since each digital twin can estimate many parameters, a large number of comparisons can be created. Other ways to employ a plurality of digital twins DT1, DT2, DT3 is ensemble estimations. Ensemble modeling methods use a plurality of models to obtain an estimate.

To some extent methods with a plurality of digital twins DT1, DT2, DT3 might be considered an ensemble method. However, a special form of ensemble is illustrated by an example in which the first digital twin DT1 is a deterministic (Newtonian) model, the second digital twin DT2 is Boxian, and the third digital twin DT 3 is Fisherian. Thus, the third digital twin DT3 can be a nearly pure artificial intelligence method, such as a neural net. This provides a process to employ computationally intensive methods such as neural nets, while constraining the scope of their computations. Of course, the number of digital twins (or virtual representations) may include a plurality thereof.

A disclosed system includes plausible virtual simulation of real systems and environments. It further includes methods for monitoring real systems by collecting data and analyzing the data in the context of one or more virtual systems to determine if parameters deviate from either dynamically estimated, or a predetermined acceptable range. The system and method discloses a heretofore method involving a plurality of digital twins, including dynamic digital twins.

A digital twin (or digital virtual twin, also referred to as a virtual representation) can be recognized as a representation of an object such as a physical object by a serial number in a configuration or relational database. For example, a vehicle with a particular vehicle identification number ("VIN") can have a particular turbocharger or none at all. The physical object is the original item, and a unique virtual digital representation that represents the physical object is a digital twin. A digital twin can be employed to identify a particular item in the object, such as a front wheel bearing obtained from a particular vendor.

From a further perspective, a digital twin can be a trained artificial intelligence representation. Such a digital twin can provide, for example, a statistical estimate of performance such as a statistical estimate of performance for a large number of wind turbines produced by a particular supplier. Variations among digital twins for a wind turbine can include, for instance, tower heights, blade lengths, propeller pitches, and other physical characteristics of the wind turbines for individualization of a particular product.

No single definition or utilization of a digital twin by itself would be as powerful as having plural, coherent representations of an object or assembly working in a hierarchy and in concert. For example, one digital twin could be formed in a relational database twin keyed off serial numbers of object therein. Another digital twin could be based on an artificial intelligence representation. A third digital twin could be based on a physical model or a physics-based simulation.

As an example, a relational database could indicate a high failure rate of a particular bearing. An artificial intelligence representation could indicate that observed failures are not related to the particular bearing. The physics-based model could suggest the particular bearing is the problem. The artificial intelligence representation cannot have acquired enough data to suggest the particular bearing is the problem. These several database processes can produce results asynchronously, some of which can produce old, static data, and some produce data at different rates.

If there are a plurality, rule-based, cause-and-effect, physics-based digital twins, substantial differences can be observed in a digital twin directed to helping objects work versus a digital twin directed to how objects fail. These are supplements to artificial intelligence-directed processes that learn and observe nominal values of parameters of a physical objects. For example, characteristics such as temperature rises above an ambient temperature or a current drawn by a motor can be observed by an artificial-intelligence process. The artificial-intelligence process learns patterns and relationships and identifies departures from nominal characteristics. It can even predict an expected failure by observing rates of departure from a nominal characteristic. Nonetheless, artificial-intelligence processes generally do not identify reasons for a failure, such as a failure of a particular bearing.

A physics-based model would be employed to identify a likely reason for a failure. Thus, prediction produced by the physics-based model can be employed to identify an oncoming failure.

Prescription represents identification of how a physical object is going to break. For example, in the case of an oil well, an artificial-intelligence process can predict that a particular oil well will stop pumping oil, but will not identify why, such as a failure of a seal on a particular pump. Prescription identifies the broken seal, not a failed pump motor.

A generic model of an electric motor can be constructed, perhaps using a preconfigured design. Configuration choices for the electric motor are made, such as single phase versus three phase, line voltage, horsepower rating, all of which provide substance for the physical model. The electric motor is coupled to a downstream element in the oil-pump apparatus such as a pump itself. After a number of such elements are configured, a physical model of an object can be constructed.

Subject matter experts can identify what elements break in such an arrangement and with what frequency, unlike an artificial-intelligence process with limited training. Candidate elements and their failure frequency can be entered into a relational database.

Two physical model types can be recognized. One is a physics-based model of how a physical object or assembly works, and the other is a physics-based model of how a physical object or assembly fails. If the electric power input to a pump is known but the oil output produced by the pump is less than an expected value, then one can tell that something has failed, but not what failed. The failure-based model can identify a possible failed element or an element that is likely to fail soon. A physics-based model of how a nominal object works, and a physics-based model of how an object fails can be distinct from each other. The operation of these models, particularly in conjunction with an artificial-intelligence process, can provide substantial advantages and is more powerful.

For example, if an object operates unexpectedly, the digital twin can recognize an inconsistency, and the artificial-intelligence twin can also produce an inconsistent result, but neither can identify why. On the other hand, the as-built digital twin can indicate there is a problem with a particular bearing, and the failure-mode twin can indicate a problem with a particular bearing. Such an arrangement wherein there is agreement between two models can provide reasonable direction for a technician to identify and exchange the particular bearing.

As a further example, a plurality of design groups or design teams can each produce independent models, such as software, wherein each software embodiment is intended to represent a same physical object or assembly. What can be unknown is the existence of particular bugs in the software, or that an unusual environment is encountered. The idea of operating an ensemble of independent models and comparison of their independent results can suggest particular failures. Nonetheless, operating dissimilar virtual representations of a physical object or component (or element) can provide insight into identifying physical failures and root causes, particularly when coherent results are not produced by the dissimilar virtual representations.

If the digital twins are capable of making similar projections, an operator enables a higher level of confidence that their projections are correct if they agree. If they disagree, there is a higher level of a need to seek a more reliable projection. The operator can choose a more reliable projection, particularly a projection closest to a projected baseline.

There is less need to choose advantages and disadvantages of particular virtual representations (e.g., a digital virtual representations). They each have their own strengths and weaknesses. An ensemble of dissimilar or diverse virtual representations provides a higher level of confidence in identifying a problem than substantially similar virtual representations, particularly when using a weighted comparison of results.

Figure 6:
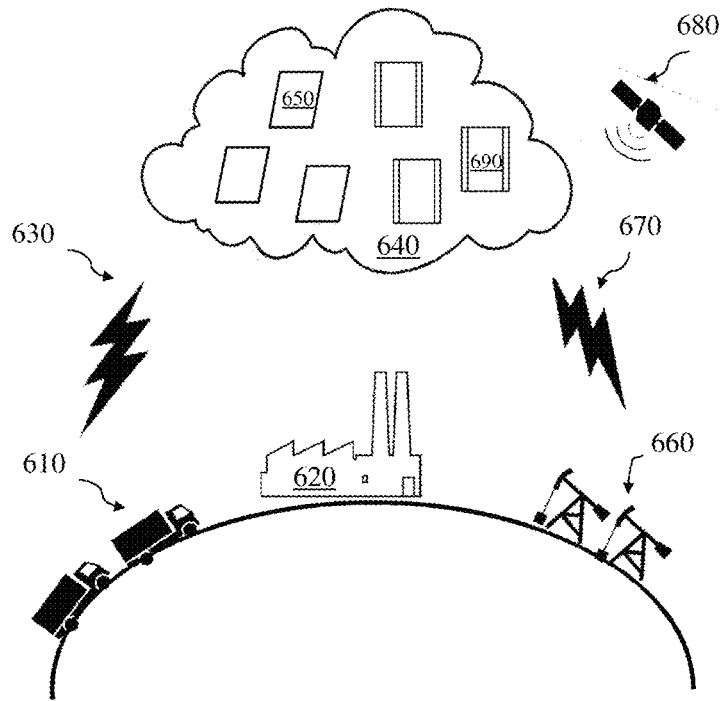
FIG. 6 illustrates a system level diagram of an embodiment of a supply chain system including delivery vehicles that deliver components to a factory.

Turning now to FIG. 6, illustrated is a system level diagram of an embodiment of a supply chain system including delivery vehicles 610 that deliver components to a factory 620. The types and quantities of components are reported via a communication path 630 from the delivery vehicles 610 and/or factory 620 to a digital environment 640 that contains data sets (one of which is designated 650) representing descriptions of products 660. Optionally, the products 660 via a communication path 670 can report operational, environmental, or other information, and to provide remote access, updates or control of the products 660. Optionally, remote observation, weather, position, navigation and timing systems 680 can provide additional information. Product models and simulations (one of which is designated 690) operate in the digital environment 640.

The products 660 in FIG. 6 include an oil field rod pump. Those skilled in the art will recognize applicability to any product, whether physical or digital. FIG. 6 uses a single digital environment 640 as an exemplary system architecture. Those skilled in the art will understand how the data sets 650, and the models and simulations 690 can exist in a plurality of environments. Further, a cloud embodiment is exemplary, and other environments can be employed.

Those skilled in the art will see that the data sets 650 can be extremely dissimilar or diverse. They can have different data constructs and architectures, represent different types of information, and be operated by different entities. Similarly, the models and simulations 690 can be diverse and dissimilar, and can include physics-based models, engineering simulations, and artificial intelligence ("AI") based algorithms.

Modern systems production often generates very high volumes of product output. It is desirable to have supply chain diversity, and to offer product diversity. For example, the automotive firm Toyota reports a typical car has about 30,000 components. This makes it probable that every car is made of a unique combination of components (or elements). Stated another way, it is unlikely that any two cars are absolutely identical in every way. This diversity is a challenge in the configuration of high fidelity digital twins.

FIG. 6 illustrates a challenge of diversity for implementing digital twins, including diversity of data sets 650, diversity of vendors across the supply chain system, diversity of digital representations, models and simulations 690, and configuration diversity of the products 660. Those skilled in the art will recognize the types of diversity mentioned are exemplary, and others could be described.

Figure 7:
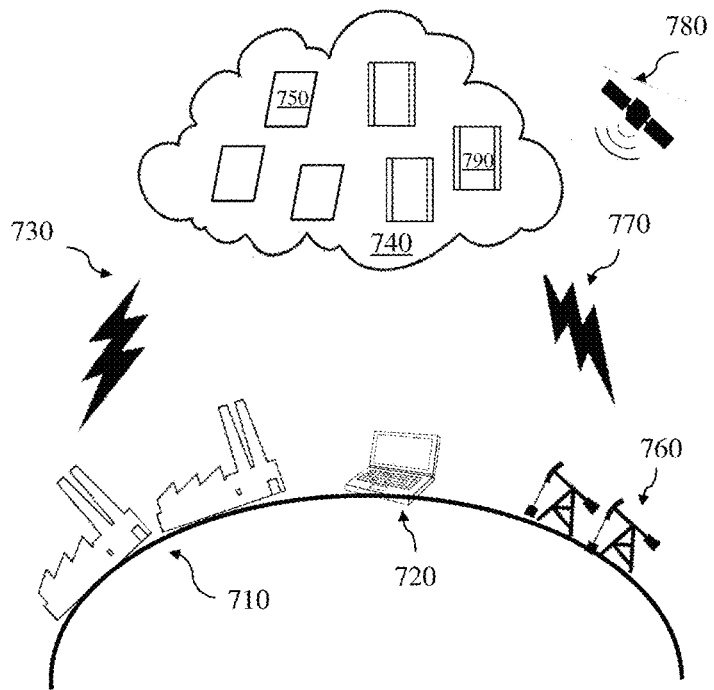
FIG. 7 illustrates system level diagram of an embodiment of a supply chain system including a plurality of original equipment manufacturers' ("OEMs") factories to provide products to a customer operating a controller.

Turning now to FIG. 7, illustrated is system level diagram of an embodiment of a supply chain system including a plurality of original equipment manufacturers' ("OEMs") factories 710 to provide products 760 to a customer operating a controller 720. The types and quantities of components are reported via a communication path 730 from the factories 710 to a digital environment 740 that contains data sets (one of which is designated 750) representing descriptions of the products 760 sourced from multiple vendors. Optionally, the products 760 via a communication path 770 can report operational, environmental, or other information, and to provide remote access, updates or control of the products 760. Optionally, remote observation, weather, position, navigation and timing systems 780 can provide additional information. Product models and simulations (one of which is designated 790) operate in the digital environment 740.

FIG. 7 illustrates the compounding of diversity when multiple OEMs provide the products 760, not only are the products 760 dissimilar or diverse, but the data sets 750 and models and simulations 790 may also be dissimilar and diverse. Further because of the multiple parties involved there is no practical means to establish useful standards to manage this diversity. The problems are further compounded by the trade secrets, proprietary data, privacy restrictions, and cyber security concerns of the parties.

The products 760 in FIG. 7 include an oil field rod pump. Those skilled in the art will recognize applicable to any product, whether physical or digital. FIG. 7 uses a single digital environment 740 as an exemplary system architecture. Those skilled in the art will understand how the data sets 750 and the models and simulations 790 can exist in a plurality of environments. Further, a cloud embodiment is exemplary, and other environments can be employed. FIG. 7 further illustrates the challenge of high fidelity configuration of digital twins. The customer may operate dissimilar equipment from multiple vendors. Thus, the diversity challenges already discussed are compounded. The principles as described above can also apply to the embodiments as introduced hereinbelow.

Figure 8:
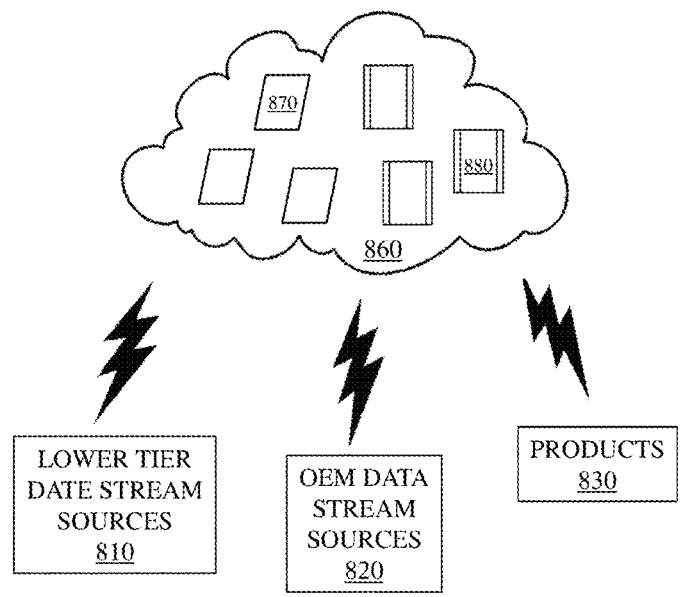
FIG. 8 illustrates a system level diagram of an embodiment of a digital environment including a data sets, and models and simulation from a plurality of data sources.

Turning now to FIG. 8, illustrated is a system level diagram of an embodiment of a digital environment 860 including a data sets (one of which is designated 870), and models and simulation (one of which is designated 880) from a plurality of data sources. The data sources communicate with the digital environment 860 via respective communication paths. The data sources include, without limitation, lower tier vendor data stream sources 810, OEM data stream sources 820 and the products 830. Examples of other sources include remote observation, weather, position, navigation and timing systems, market information, traffic information, and other information. Those skilled in the art will understand the nature of additional information flows associated with products of different types.

Thus, the digital environment 860 contains a plurality of data sets 870 representing a plurality of products 830. The digital environment 860 further contains a plurality of models, representations, and simulations 880 of the products 830. FIG. 8 further illustrates the challenge of high fidelity configuration of digital twins. In addition to the problems of security, privacy, diversity, and dissimilarity already discussed, the data streams are typically asynchronous.

The data sets 870 are under configuration control by multiple parties and can include confidential information controlled by multiple parties. In a similar fashion the models and simulations 880 are controlled by multiple parties, and their use can be restricted due to proprietary issues or other issues such as privacy protection, and cyber security.

Figure 9:
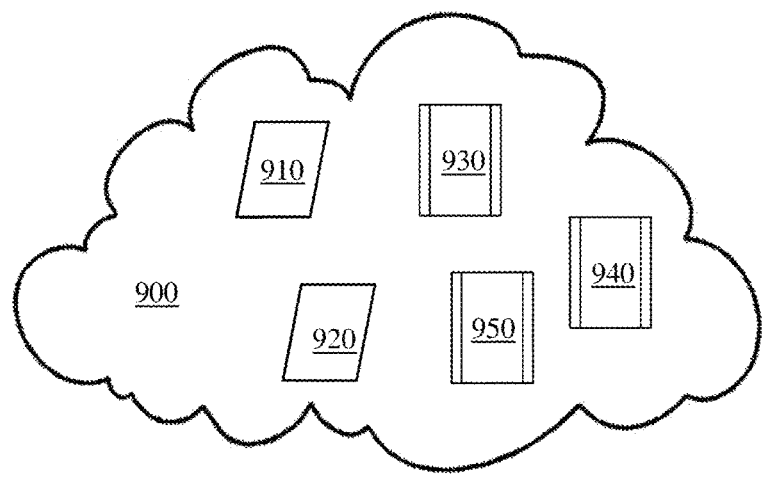
FIG. 9 illustrates a system level diagram showing diversity of data sets, and models and simulations in a digital environment.

Turning now to FIG. 9, illustrated is a system level diagram showing diversity of data sets, and models and simulations in a digital environment 900. The data sets include a bill of materials ("BOM") 910 for each product type, which is a data set listing in detail, for instance, the part types, and number of each part type needed to produce the product. The data sets can include an as-built data set 920, which lists by serial number, the detailed configuration of each product. The as-built data set 920 can be used to attribute the contribution of each supplier in the supply chain to individual products by serial number. This is necessary for practical reasons including safety recalls and warranty management, among other examples which might be cited.

Similarly, a plurality of diverse models, simulations and representations exist in the digital environment 910. They can include three dimensional representations 930 used for computer aided design, computer aided manufacturing, and for product visualization in virtual reality ("VR"). They can further include a machine learning and artificial intelligence model 940 derived from observations of operations. A further example is a physics and engineering-based simulation 950. Such a cause and effect-based model can represent the proper operation of the product, the failure modes of the product, or both. Other examples, not shown might include rules-based models incorporating business rules, maintenance schedules or usage guides. Those skilled in the art will appreciate the variety of examples which could be cited. All the elements described within the digital environment 900 have been proposed or cited as "digital twins." From this one can see a plurality of digital twins.

Further one can see problems which arise from the diversity and complexity of these digital twins. FIG. 9 helps to illustrate some of these important problems. A vendor notice can trigger a product recall. The as-built data set 920 could be used to identify by serial number the products to be recalled. The recall might best be coordinated by comparing the results of models—machine learning and artificial intelligence model 940 and physics-based models 950. The digital twins from the data sets, and models and simulations are unlikely to generate similar predictions about failures, or about which serial numbers should be recalled first. From this one can see a desirability of coordination among the digital twins.

Figure 10:
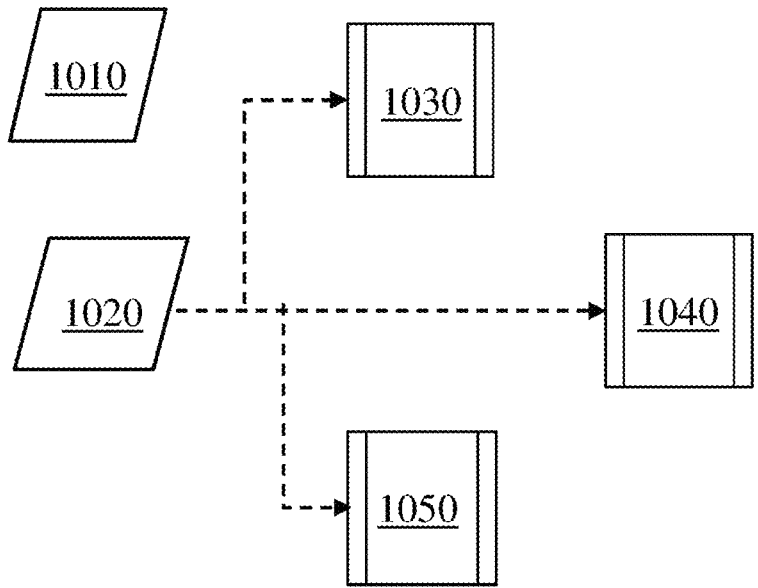
FIG. 10 illustrated is a system level diagram demonstrating a hierarchy among a plurality of digital twins.

Turning now to FIG. 10, illustrated is a system level diagram demonstrating a hierarchy among a plurality of digital twins. As an example, an as-built data set 1020 (and potentially a bill of materials ("BOM") 1010) can be used to configure and control model based digital twins such as three dimensional representations 1030, machine learning and artificial intelligence models 1040 and physics-based models 1050.

The as-built information from the as-built data set 1020 might as an example, distinguish between products with three-phase electric motors, single phase motors, and pneumatic motors. This information would automatically configure the virtual reality information presented and drawn from the three dimensional representations 1030. It further constrains the inferences drawn by the machine learning and artificial intelligence models 1040. It configures the physics-based model 1050. From this one can see how using a hierarchy among the digital twins to automatically configure and provision the twins, lessens the impact of complexity and diversity, lowers the cost of digital twin deployment, and improves the fidelity of both individual digital twins, and of the plurality of digital twins acting in concert as a system.

Further, the as-built information from the as-built data set 1020 can be provided without violations of privacy, proprietary protections or cyber security. For example, the source of the three-phase motor, known to the OEM can be shielded from the customer using the product. Those skilled in the art will appreciate how data base queries from the as-built data set 1020 can be managed to observe and avoid such concerns.

Figure 11:
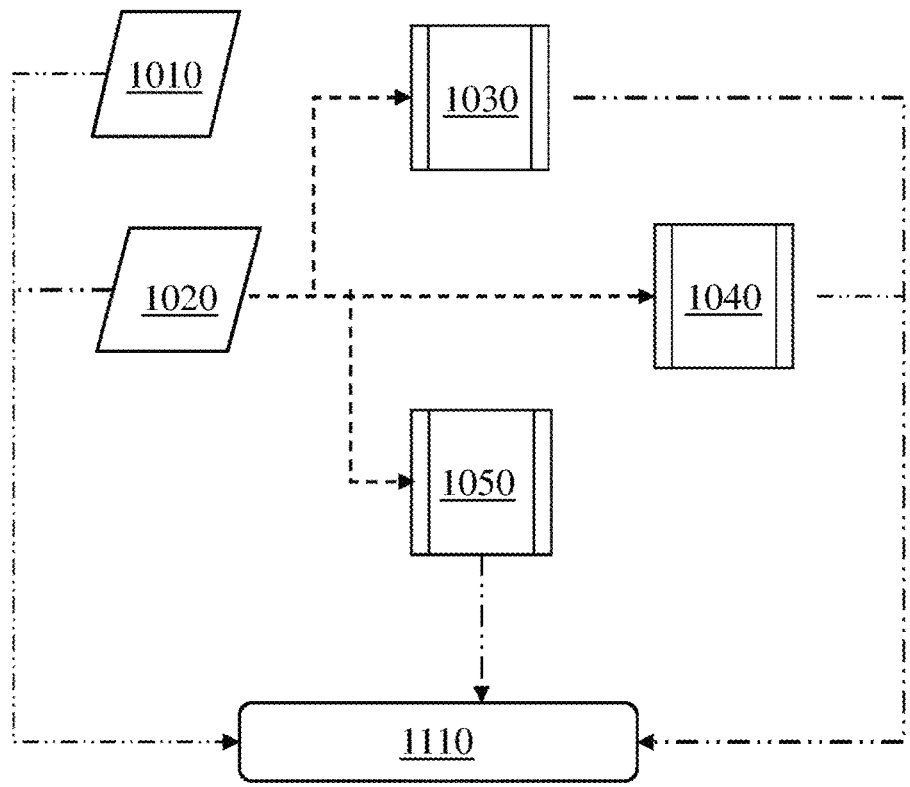
FIG. 11 illustrates a system level diagram demonstrating coordination, hierarchy and orchestration of a plurality of digital twins.

Turning now to FIG. 11, illustrated is a system level diagram demonstrating coordination, hierarchy and orchestration of a plurality of digital twins. As illustrated in FIG. 10, a hierarchy is used to coordinate the configuration of the digital twins, and again in this example, the as-built data set 1020 provisions and defines the configuration of model-based digital twins.

In this example, an umpire 1110 compares the findings, forecasts, predictions and prescriptions from the ensemble of the bill of materials ("BOM") 1010, the as-built data set 1020, three dimensional representations 1030, machine learning and artificial intelligence models 1040 and physics-based models 1050. The umpire 1110 can be configured simply as a voting-based system or can incorporate other information and business rules that might otherwise be omitted. These are examples, and other means to configure the architecture will be apparent to those skilled in the art. The umpire 1110 can be configured to combine, or to compare any combination of results of the members of the ensemble.

The ensemble can include findings from multiple digital twins of the same type. As an example, the machine learning and artificial intelligence models 1040 will benefit from data from many serial numbers. An ensemble that draws information from a plurality of both similar and dissimilar digital twins is desirable in many cases. Thus, the ensemble can include information from similar digital twins across serial numbers, dissimilar digital twins for the same serial number, or both. For example, if the umpire 1110 includes Bayesian estimation, the estimated odds of a condition occurring in a given serial number can be estimated from information about that unique object, from information from a plurality of digital twins of that unique object, from information derived by the digital twins of multiple unique objects, or any combination thereof.

An important attribute of this system configuration is that the umpire 1110 can be configured without detailed knowledge of the other digital twins. If elements of the ensemble represent sensitive information from multiple parties, trade secrets, or cyber security risks, the umpire 1110 need not expose those matters. For example, it can be desirable to lessen how explainable the umpire's reporting can be by ignoring why an element of the ensemble votes in a given manner, and simply focus on how each member of the ensemble is reporting or voting.

This approach naturally deconflicts disagreements among the digital twins. It provides a means to manage complexity and diversity naturally. It is explainable and provides decision makers with a clear set of rationale for the findings, forecasts, predictions and prescriptions. It ensures that computer aided intervention, such as VR-based field service advisories are coherent with the specific interventions prescribed.

Those skilled in the art will see that without such coordination, hierarchy, and orchestration, practical problems arise. As introduced herein, the cost of digital twin configuration management is greatly reduced. Explainability is greatly improved, and provisioning costs are lowered. Orchestration between different types of models is greatly improved. Tradeoffs between explainable findings and security are naturally managed. Other benefits will be apparent to those skilled in the art.

A further process introduced herein is to use one digital virtual representation to construct another. The issue is how to efficiently create a virtual representation of a complex physical apparatus. For example, there can be a large number of automobiles produced by a manufacturer that ordinarily would have complex digital virtual representations that would need to be created manually. If there is a need to build a failure digital twin of particular vehicle, a generic model of the particular vehicle can be invoked. From a relational database, the configuration of the particular vehicle can be identified. Particular changes from the generic model are identified and added to the particular vehicle model. Thus, one of the virtual representations of a particular vehicle is automatically configured based on what is known about another particular vehicle or about a generic vehicle. Thus, one digital twin is employed to automatically configure another. One virtual representations is automatically configured based on characteristics of another virtual representation.

In an example following processes introduced herein, a military fire-control unit is deployed in a remote, insurgent environment. A responsible officer at a headquarters position employs a computer that recognizes that three fire-control radar systems are currently operational in this unit, and a fourth fire-control radar system is not operational. If the insurgent environment has deteriorated and has become more dangerous, it can be desirable to add two additional fire-control radars to provide a total of five fire-control radar systems, a number that might normally be operational with this particular fire-control unit. The deteriorated situation is reported to headquarters. To construct and characterize the battle arrangement at headquarters, a digital twin of that fire-control unit is configured according to field reports that describe what equipment is currently operational and other particular characteristics. At a system level, a large number of these fire-control units and supporting forces operate in concert, which requires that numerous and detailed parameters for each of them be known. It would be inefficient for staff at headquarters to manually configure these fire-control units, which would require manually downloading extensive relevant characteristics from a database that describe and characterize what is actually installed and what is actually operational in the field. The process introduced herein enables automatic configuration of these fire-control unit digital twins, which could be performed with a few mouse clicks.

A similar situation arises and can be addressed when creating a digital twin of one or more railroad cars. It is desirable to provision automatically a digital twin of a car with its nameplate data and other modeling characteristics, which can be performed, for example, on a daily or weekly basis. A database is provided with exemplary digital twins that indicate characteristics by serial number, such as which cars are tank cars, which are boxcars, how each car is painted, what braking arrangement is installed, etc. A digital twin of a particular car of interest is automatically constructed from a digital twin in the database with reduced (e.g., minimal) human interaction. Differences of the particular car, such as a stainless steel coupler, Teflon valves, etc., are recognized. The model for a particular car of interest can include high-level data and characteristics that cannot be directly extracted from one database, for example, data that enables numerous detailed operational and physical characteristics of a car to be simulated, which cannot be one-for-one entries in a general high-level database.

A physical characteristic in a general database can be expanded to provide the detailed characteristics required for a simulation. Missing data such as a three-phase motor versus a one-phase motor can be expanded automatically with generic model characteristics to enable a simulation to be performed in the absence of particular data entries. A digital twin in the database of general railroad cars is updated with differences of a particular car of interest, and these differences are automatically retrieved from a database, which can be an artificial-intelligence database or a nameplate database, to produce a digital twin for the car of interest. Thus, one digital twin in one or more databases is used to provision automatically a digital twin for a particular car of interest, which provides a more economical way to configure the digital twin for the particular car of interest. The result is production of a high-fidelity digital twin.

Figure 12:
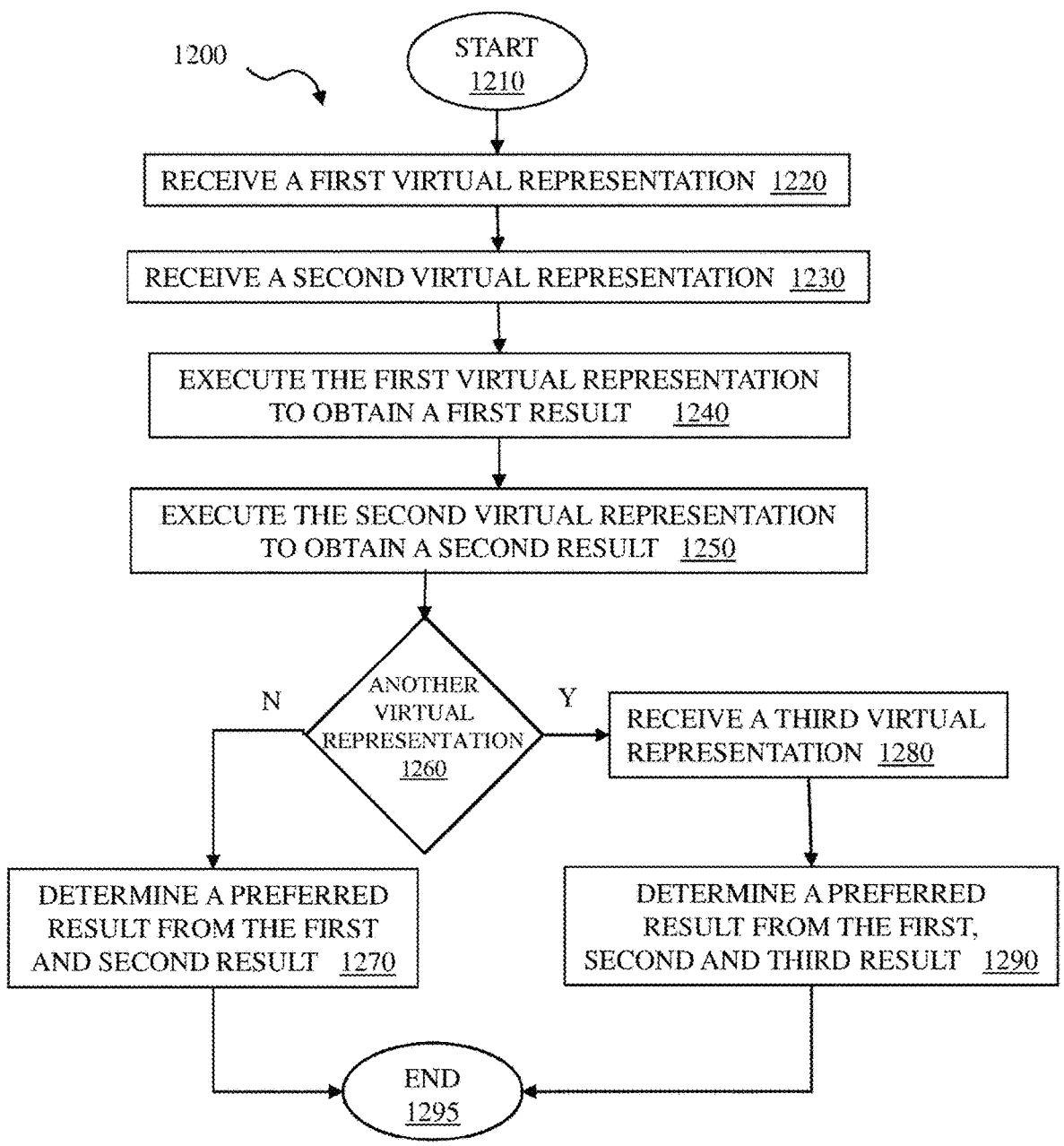
FIG. 12 illustrates a flow diagram of an embodiment of a method of determining a characteristic of an object.

Turning now to FIG. 12, illustrated is a flow diagram of an embodiment of a method 1200 of determining a characteristic of an object (e.g., a physical object) or inferring an operating characteristic of a parameter (component or element) of the object employing virtual representations (or digital twins). The method 1200 operable on an apparatus (e.g., apparatus 1400 of FIG. 14 within a digital environment illustrated with respect to FIGS. 6 to 9) begins at a step or module 1210. In an embodiment, the virtual representation of the object is a digital virtual representation (e.g., a first physics-based model of an operation) of the object. At a step or module 1220, a first virtual representation of the object is received.

At a step or module 1230, a second virtual representation (e.g., a second physics-based model of an operation failure) of the object is received, the second virtual representation being diverse from the first virtual representation. In an embodiment, the second virtual representation is diverse from the first virtual representation based on a design thereof.

At a step or module 1240, the first virtual representation of the object is executed to obtain a first result. At a step or module 1250, the second virtual representation of the object is executed to obtain a second result. The execution of the first virtual representation and/or second virtual representation may be by performing digital simulations thereof. The execution of the first virtual representation and the second virtual representation may be performed asynchronously and at different rates.

At a decisional step or module 1260, the method 1200 determines if another virtual representation of the object is available. If not, the method 1200 transitions to a step or module 1270, otherwise the method 1200 transitions to the step or module 1280.

At a step or module 1270, a preferred result is determined based on the first result and the second result. The determination of the preferred result may be a result of performing an arithmetic operation (e.g., a weighted arithmetic operation) on the first result and the second result, an artificial intelligence process on the first result and the second result, and/or an artificial intelligence process to determine a deviation of at least one of the first result and the second result from a normal value. The determination of the preferred result may be a result of comparing the first result to the second result. The method then ends at an end step or module 1295.

At a step or module 1280, a third virtual representation of the object is received and, at a step or module 1290, a preferred result is determined by comparing the first result and the second result with the third result and selecting one of the first result and the second result based on a difference with the third result. The method 1200 then ends at the end step or module 1295. Of course, once the result is determined, it is possible to perform other actions to remedy an operational shortcoming associated with the object to, for instance, augment the performance thereof or avert a potential failure.

Figure 13:
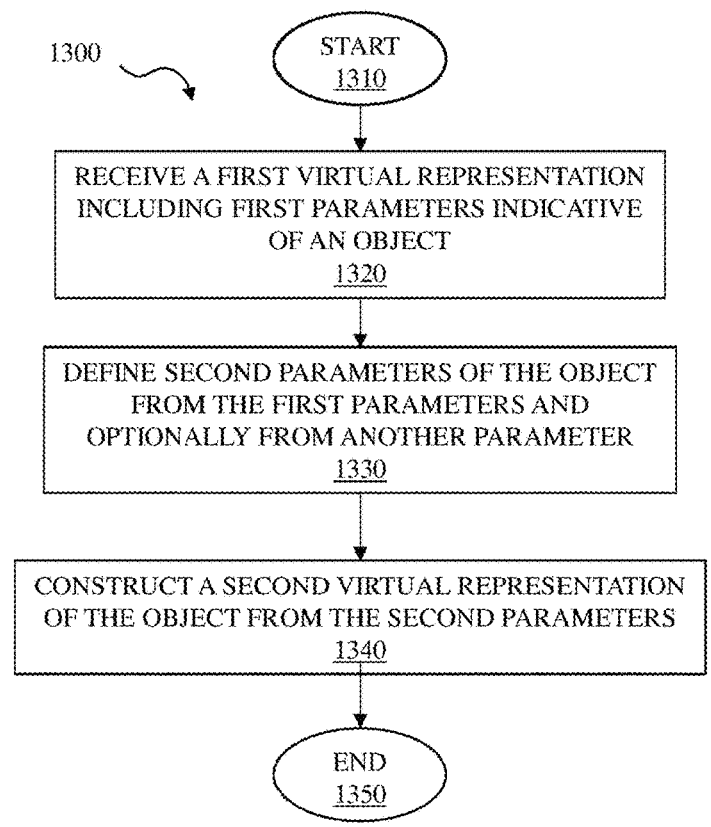
FIG. 13 illustrates a flow diagram of an embodiment of a method of constructing a virtual representation of an object.

Turning now to FIG. 13, illustrated is a flow diagram of an embodiment of a method 1300 of constructing a virtual representation of an object (e.g., a physical object). The method 1300 operable on an apparatus (e.g., apparatus 1400 of FIG. 14 within a digital environment illustrated with respect to FIGS. 6 to 9) begins at a step or module 1310. At a step or module 1320, a first virtual representation is received including first parameters indicative of the object.

At a step or module 1330, second parameters are defined from the first parameters of the first virtual representation and optionally from another parameter. For instance, the second parameters may be defined from or employing a nominal value or a generic value of another parameter indicative of the object in addition to the first parameters. The second parameters may be defined from or employing an artificial intelligence process on the first virtual representation of the object.

At a step or module 1340, a second virtual representation of the object is constructed (e.g., automatically) from the second parameters. The second virtual representation may include constructing a plurality of elements of the second virtual representation via one of the first parameters. The method 1300 ends at an end step or module 1350. Of course, the system as described herein may now use the first and second virtual representations to determine a characteristic of the object akin to the method 1200 with respect to FIG. 12.

Figure 14:
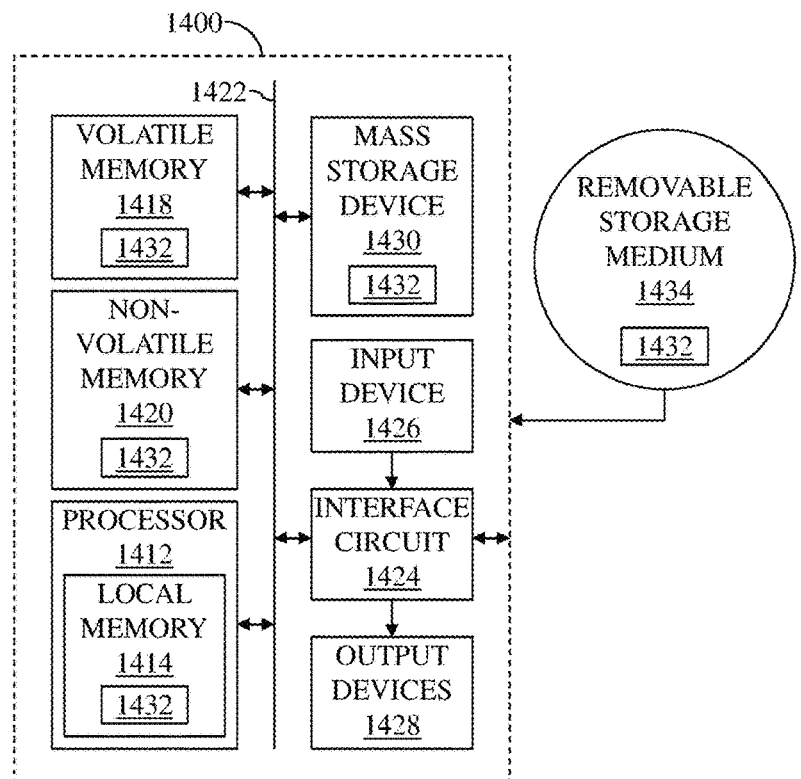
FIG. 14 illustrates a block diagram of an embodiment of an apparatus configured operate the systems, subsystems and methods disclosed herein.

Turning now to FIG. 14, illustrated is a block diagram of an embodiment of an apparatus 1400 configured operate the systems, subsystems and methods disclosed herein. The apparatus 1400 that may execute example machine-readable instructions to implement at least a portion of one or more of the methods and/or processes described herein, and/or to implement virtual representation(s) of an object for the purposes as described herein. The apparatus 1400 may be embodied in, for example, controllers, special-purpose computing devices, servers, personal computers, personal digital assistant ("PDA") devices, smartphones, smart glasses, tablets, internet appliances, and/or other types of computing devices.

The apparatus 1400 may include a processor (or processing circuitry) 1412 such as, for example, a general-purpose programmable processor. The processor 1412 may include a local memory 1414, and may execute coded instructions 1432 present in the local memory 1414 and/or another memory device. The processor 1412 may execute, among other things, machine-readable instructions or programs to implement the methods and/or processes described herein. The programs stored in the local memory 1414 may include program instructions or computer program code that, when executed by an associated processor, enable the apparatus 1400 to perform tasks as described herein. The processor 1412 may be, include, or be implemented by one or a plurality of processors of various types suitable to the local application environment, and may include one or more of general- or special-purpose computers, microprocessors, digital signal processors ("DSPs"), field-programmable gate arrays ("FPGAs"), application-specific integrated circuits ("ASICs"), and processors based on a multi-core processor architecture, as non-limiting examples. Other processors from other families are also appropriate.

The processor 1412 may be in communication with a main memory, such as may include a volatile memory 1418 and a non-volatile memory 1420, perhaps via a bus 1422 and/or other communication means. The volatile memory 1418 may be, include, or be implemented by random access memory ("RAM"), static random access memory ("SRAM"), synchronous dynamic random access memory ("SDRAM"), dynamic random access memory ("DRAM"), RAMBUS dynamic random access memory ("RDRAM") and/or other types of random access memory devices. The non-volatile memory 1420 may be, include, or be implemented by read-only memory, flash memory and/or other types of memory devices. One or more memory controllers (not shown) may control access to the volatile memory 1418 and/or the non-volatile memory 1420.

The apparatus 1400 may also include an interface circuit 1424. The interface circuit 1424 may be, include, or be implemented by various types of standard interfaces, such as an Ethernet interface, a universal serial bus ("USB"), a third generation input/output ("3GIO") interface, a wireless interface, and/or a cellular interface, among others. The interface circuit 1424 may also include a graphics driver card. The interface circuit 1424 may also include a device such as a modem or network interface card to facilitate exchange of data with external computing devices via a network (e.g., Ethernet connection, digital subscriber line (DSL), telephone line, coaxial cable, cellular telephone system, satellite, etc.).

One or more input devices 1426 may be connected to the interface circuit 1424. The input device(s) 1426 may permit a user to enter data and commands into the processor 1412. The input device(s) 1426 may be, include, or be implemented by, for example, a keyboard, a mouse, a touchscreen, a track-pad, a trackball, an isopoint, and/or a voice recognition system, among others. The input device(s) 1426 may include an image-capturing device configured to capture an image or video and provide visual content of field equipment at a job site.

One or more output devices 1428 may also be connected to the interface circuit 1424. The output devices 1428 may be, include, or be implemented by, for example, display devices (e.g., a liquid crystal display or cathode ray tube display ("CRT"), among others), printers, and/or speakers, among others.

The apparatus 1400 may also include one or more mass storage devices 1430 for storing machine-readable instructions and data. Examples of such mass storage devices 1430 include floppy disk drives, hard drive disks, compact disk ("CD") drives, and digital versatile disk ("DVD") drives, among others. The coded instructions 1432 may be stored in the mass storage device 1430, the volatile memory 1418, the non-volatile memory 1420, the local memory 1414, and/or on a removable storage medium 1434, such as a CD or DVD. Thus, the modules and/or other components of the apparatus 1400 may be implemented in accordance with hardware (embodied in one or more chips including an integrated circuit such as an ASIC), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor.

For a better understanding of related topics to the digital twin and associated topics, see, U.S. Pat. No. 7,409,319, U.S. Patent Application Publication No. 2007/0043497, U.S. Patent Application Publication No. 2009/0320609, U.S. Patent Application Publication No. 2013/0124616, U.S. Patent Application Publication No. 2015/0192456, and U.S. Patent Application Publication No. 2017/0351241. For other related topics, see 2014 Whitepaper on Digital Twins by Dr. Michael Grieves, 2017 Whitepaper on Digital Twins by Oracle, 2017 Marketing Materials by GE, EU General Data Protection Regulation Website, J. Scott Armstrong, including "Principles of Forecasting," Third Printing, 2003 and, "Golden Rule of Forecasting" (Armstrong, et al.) 2015, Journal of Business Research. The aforementioned references are incorporated herein by reference.

Sensor-less IoT Digital Twins

The foregoing has described essential and optional features for systems and methods of utilizing digital twins. In some implementations, it can be desirable to employ digital twins without the need for sensors providing direct observations for each object, device or system (hereinafter, collectively "object"); as an alternative, cause-effect relationships and external observables can be utilized to infer the state of an object represented by a digital twin. Many objects can be deployed in large numbers, with each member of the population being used in unique ways and exposed to unique environments and stressors. A unique digital twin of each member of the population is useful for estimating potential performance, predicting useful life, and prescribing maintenance interventions. For large numbers of objects, however, the number of physical sensors required to uniquely characterize each object could grow exponentially; thus, it is desirable to minimize the number of sensors needed to deploy useful digital twins. Minimizing or eliminating the need for sensors lowers the cost of establishing digital twins and accelerates deployment of digital twin systems.

A first example of a type of system which typically lacks adequate sensors is found in explosive and energetic devices, such as Cartridge Activated Devices and Propellent Activated Devices (CAD/PADs). The U.S. government buys a large number of these devices, mainly for emergency one-shot uses. For example, they include all of the explosive and propulsion components for fighter jet ejection seats; such aircraft often have two or three dozen such devices.

The CAD/PAD devices are sealed, making it impossible to directly observe their chemical state, and the stability of the energetic materials degrades with time, so safety dictates their replacement as part of vehicle maintenance. Historically, the U.S. military has used installed life-time as the measure to dictate replacement; i.e., the replacement interval is simply calendar based. A calendar-based approach, however, has two important shortcomings. First, it wastes money. CAD/PADs are often tested after removal and, in some cases, such testing shows more than 90% of safe life remains. Second, removing a device can be unsafe. There have been catastrophic incidents where aircraft were damaged by un-commanded CAD/PAD initiation, even though the devices were not yet scheduled for replacement.

It was known that environmental conditions can change the life span of CAD/PAD devices. In particular, it was suspected that heat degraded the explosive stabilizer, which prevents unintentional explosions; i.e., as the stabilizer degrades, an unintentional detonation can occur. The inventors developed a digital twin architecture to address that problem; the U.S. Navy accepted the architecture and awarded the Assignee of the present application a contract to demonstrate the concept.

FIG. 15 illustrates an exemplary digital twin architecture that employs sensor-less digital twins in the real-world CAD/PAD application. The architecture is based on a temperature profile module 1510, a stabilizer profile module 1520, and a remaining useful life module 1530. The temperature profile module 1510 provide an estimate of the temperatures at various locations around an aircraft based on environmental conditions (sun load, temperatures, and other factors). The stabilizer depletion module 1520 estimates the degradation of the stabilizer in each device, based on its characteristics (chemistry, size, etc.) when exposed to the profile defined by the temperature profile module 1510. The remaining useful life is then computed based on depletion of the stabilizer.

Figure 16:
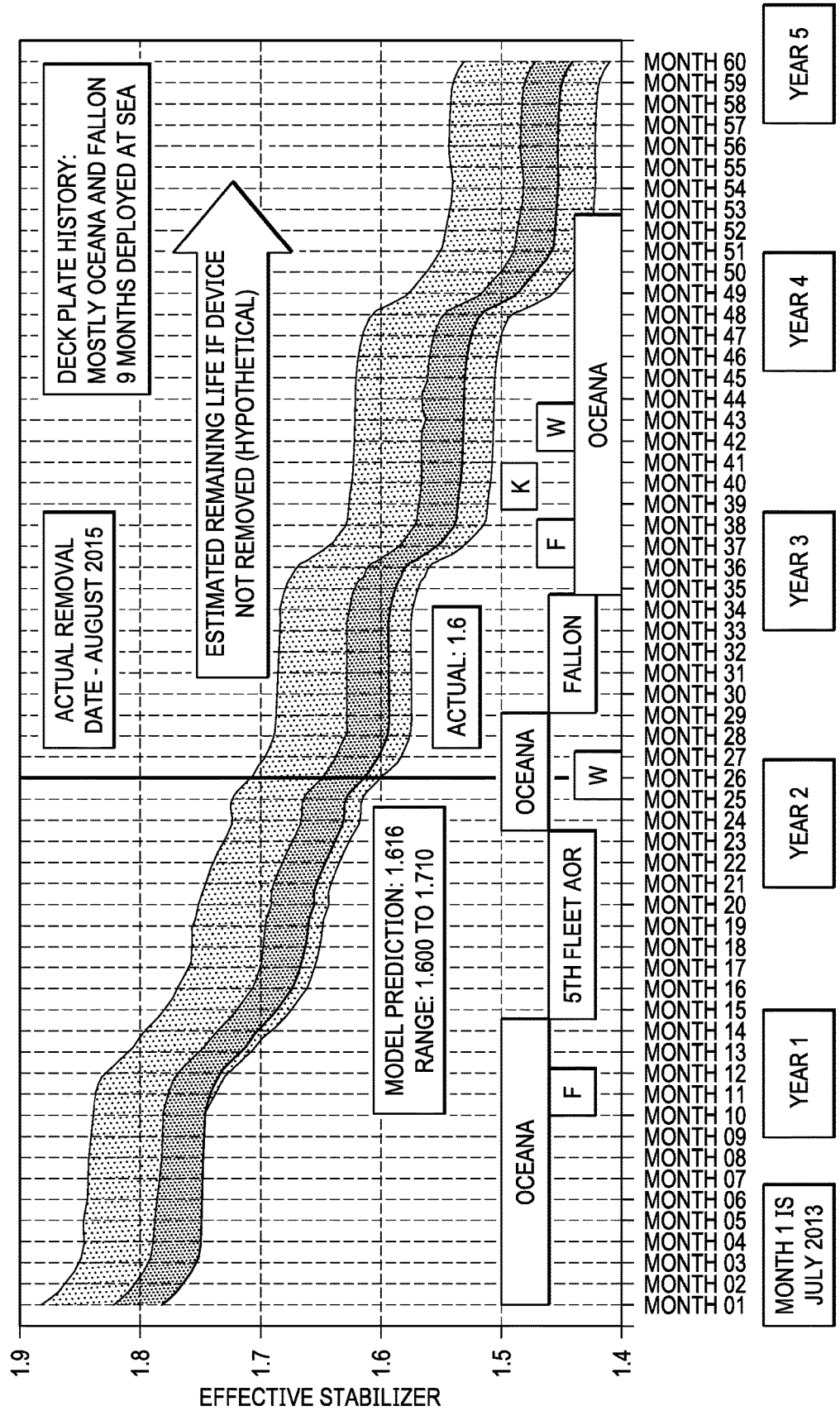
FIG. 16-A illustrates a first graph of predicted and actual test results for the exemplary digital twin architecture of FIG. 15.

The only data the U.S. Navy had recorded by aircraft tail number was the log book location records in a data base known as "Deck plate"; using the principles disclosed herein, that data was used to estimate remaining useful life for each CAD/PAD device for each aircraft. Of particular interest were those cases where an accidental explosion of a CAD/PAD device had occurred. FIG. 16-A illustrates a graph of predicted CAD/PAD remaining useful life, based on the deck plate data, using the exemplary digital twin architecture of FIG. 15; the model correctly predicted an accident was possible exactly when it occurred. Since the Navy had several aircraft at that location, it was (in hindsight) nearly inevitable one of them would suffer such an accident.

The model was also validated for CAD/PAD devices which had been removed and tested for chemical composition. FIG. 16-B illustrates predicted stabilizer mass using the exemplary digital twin architecture of FIG. 15, for one such device, and the actual test result. The model estimated the stabilizer would constitute 1.616% of the chemical mass on removal; chemical analysis showed that it was 1.6%, agreeing well within the margin of error. The particular aircraft from which the CAD/PAD was removed had moved to several separate locations, yet the logbook record of location and date, was enough data to correctly drive the thermal model, and in turn predict the depletion of the explosive stabilizer over a period of two years. Validation tests of other CAD/PAD devices (including another accidental explosion) showed comparable results; all cases agreed within the margin of error.

A second example of an application which typically lacks adequate sensors is found in cases where depletion of a chemical can be desirable. Some chemical compounds exhibit an attribute known as "outgassing". Outgassing (also known as off-gassing) is the release of gas from plastics, paints, adhesives, encapsulants, lubricants, sealants, and other materials. Some organic compounds include, and even rely on the release of Volatile Organic Compounds (VOCs). For example, paints and other finishes outgas as they dry. Plastics and polymers can also outgas. Volatile products used in the production or application of polymer materials can become trapped in the polymer matrix. Under certain conditions these volatile materials can transition into the gaseous state and escape the polymer compound. These escaped gases can condense on nearby equipment, potentially obscuring sensitive optics or electronics. Some outgassing is a health hazard, and some can create immediate safety risks. Thus, correctly predicting when out-gassing has been diminished to an acceptable level is important in many applications.

Not all outgassing generates VOCs; other chemicals can be released, as well. Outgassed materials can range from light molecules (e.g., carbon monoxide, nitrogen compounds), which can mix in the air and may be difficult to remove, to complex heavy VOCs which tend to precipitate onto surfaces. This diversity of chemical attributes and molecular weights create a challenge in sensing outgassed chemicals. Further the molecular structures are measured in many ways, ranging from parts per billion (ppb), parts per million (ppm), or volumetrically, such as micrograms per cubic meter ($\mu g/m3$). A given application might require estimates of several outgassed compounds. Direct measurement is often impractical due to costs and the number of compounds.

For space vehicles, outgassing and deposition can be a significant challenge. Outgassing and deposition at low temperatures and low pressures proceed differently than experienced under terrestrial conditions. Orbiting space vehicles repeatedly exposed to heating and cooling from solar load and shadows see extremes which are difficult to replicate. In addition to the sensors challenge already described, sensors and electronics to support them are expensive when placed into space. Minimizing sensors for space vehicles is, thus, highly desirable.

As a result of problems associated with outgassing, items prone to outgassing may be sequestered for a period of time until outgassing has been reduced to an acceptable level. Or, if outgassing is desirable, when outgassing has diminished, an item may need to be removed. The two foregoing examples (explosives and outgassing) show how aging and time response processes can increase risks (e.g., CAD/PAD) or reduce risks (outgassing), and that direct measurement of the associated processes can be difficult.

Many other examples could be cited where it is difficult, dangerous, or undesirable to add physical sensors for the purpose of enabling a digital twin. Another example is the behavior of a number of individual "items", such as electric customers. Each customer has a time response to time of day and weather for lighting, heating, and cooling; i.e., energy production/use. For a population of digital twins, the projection of usage can be far more accurate than the model of any given user thanks to statistical principles, such as Central Limit Theorem. Other examples include finishes and paint, where direct physical contact of a sensor might mar the finish; food processing such as wine maturation, where sensors might change the flavor. Many additional examples that could benefit from application of the principles disclosed herein will be apparent to those skilled in the art. In such cases, it is desirable to create digital twins which do not require physical sensors to directly observe the phenomena of interest.

As described supra, a configuration twin can be used to provision the attributes of another digital twin. It has been recognized that "virtual sensors" can also be used to emulate operational data for objects; i.e., the "virtual sensors" are not dependent on sensors physically associated with each object. As used herein, an "object" can refer to a physical component, device or system, as well as data constructs; a data construct provides a description of something that may be used by a computer (such as a processor, a peripheral, a document, or a data set) and defines its status, its method of operation, and how it interacts with other objects.

Figure 17:
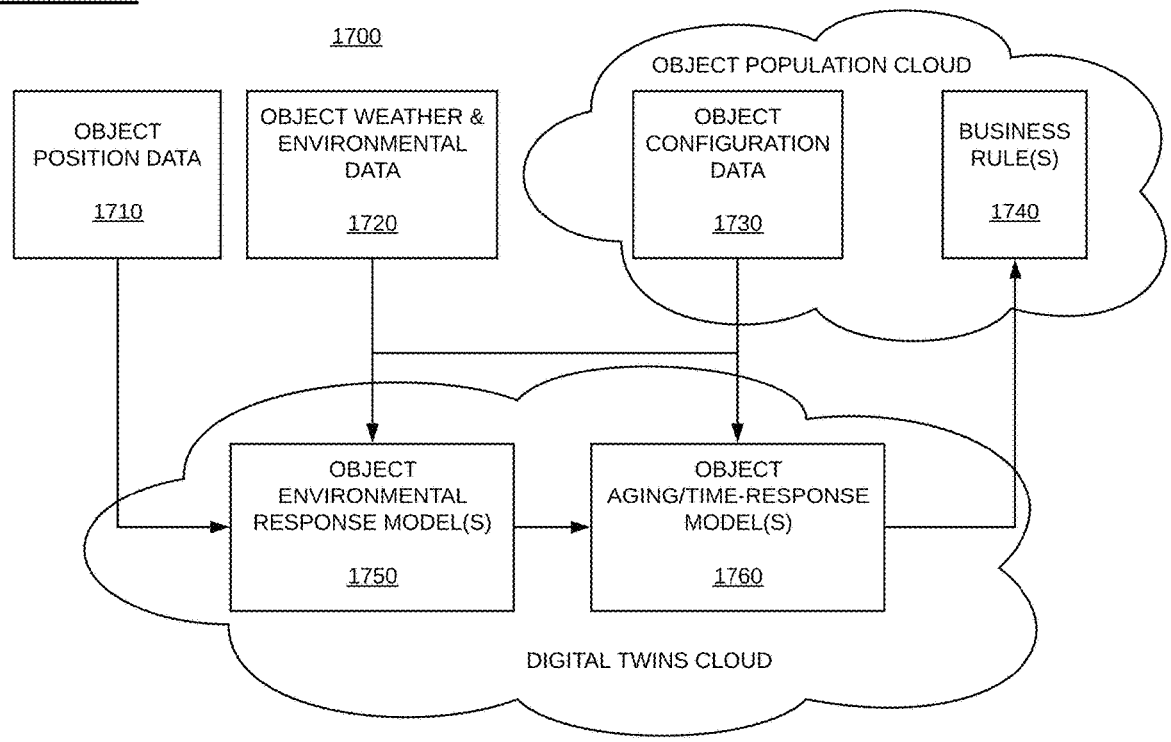
FIG. 17 illustrates an exemplary sensor-less digital twin system architecture.

Several potential solution architectures exist; an exemplary sensor-less digital twin system architecture 1700 is illustrated in FIG. 17. There are six principle elements shown in the exemplary system architecture 1700; in some embodiments, one or more of the six could be a plurality. First, an object position data module 1710 provides the position or physical location of each object from a data base, GPS tracker, or other positioning means; in some implementations, multiple location systems can be used. The position data can include both current and historical locations. In some applications, position data might simply be the record of an aging location of an object, such as an oak vat for aging wine; in other applications, a chronology of physical locations can be provided. Second, an object weather and environmental data module 1720 can provide current and historical ambient environmental conditions for the physical location(s) of an object. Such data can be from a paint booth (temperature, humidity, light spectral density, etc.), data from an area of a wine cellar, weather records for an airport, long term environmental data and other descriptions of the environmental conditions to which an object is, or has been, exposed. The environmental data also may be forecasted future conditions; such projections might be based on historical climate records, on prior records for similar objects or other means (e.g., the benefit of stochastic models, though deterministic embodiments are useful in some cases).

Third, the exemplary system architecture 1700 includes an object configuration data module 1730; as described supra, such configuration data can be used to describe an object to be twined to configure other distinct digital twins for an object. For example, distinct colors of paint are composed of different compounds, and different objects (e.g., trucks vs. cars) can have different thermal mass and respond to heat in a paint booth differently. For the CAD/PAD real-world example described supra, each device can have a different physical description due to different case materials and different energetic compounds.

Fourth, the exemplary system architecture 1700 includes an object environmental response model(s) module 1750 and object aging/time-response model(s) module 1760; one or more of each of those modules form a "digital twins cloud" for a plurality of unique objects. Those modules each have inputs from the object position data module 1710, object weather & environmental data module 1720, and the object configuration data module 1730. For each unique object, its configuration and in situ context define a different response to environmental conditions; the environmental response is reduced to a digital emulation within the system. For example, this might be a thermal model of a vehicle (aircraft, shipping container, space vehicle, wine aging vat, concrete overpass, railroad car, etc.) and the items of interest installed therein (freight, CAD/PAD, etc.).

Lastly, the exemplary system architecture 1700 includes a business rule(s) module 1740 that receives the output from the digital twins cloud; i.e., it receives the response of a digital twin representation of an object based on emulated operational data for it which is not dependent on sensors physically associated with the object (e.g., the operational data can be emulated from other data, such as the object position and weather & environmental data known for that position). The business rule(s) module 1740 can then make an operational or maintenance decision with respect to an object based on the output of the digital twins representation of it. Business or safety rules related to a specific object, or class of objects, can define thresholds or other criteria related to decisions or actions. For example, an action might be taken when wine fermentation reaches 11% alcohol, or when the explosive stabilizer of a CAD/PAD has reached a certain measure of depletion.

In the exemplary system architecture 1700, the output of the object environmental response model(s) module 1750 is an input to the object aging/time-response model(s) module 1760. For some digital twins, a plurality of aging/time response models might be needed. For example, for explosive stabilizer depletion, a separate model could be required for each explosive compound in a device. In other examples, maturation of a wine might involve projecting the levels of several different organic compounds and, in plastics manufacturing, outgassing of more than one compound may need to be emulated.

The aging/time response models can be physics and/or chemistry based. For most chemical processes, such models can be based on the Arrhenius equation, a mathematical expression which describes the effect of temperature on the velocity of a chemical reaction. The exponential equation describes slow processes at low temperatures, and faster processes at elevated temperature. Each reaction is described by different attributes. Thus, a system might require several Arrhenius descriptions, one for each chemical reaction of interest, including the interaction of reaction products. The Arrhenius equation describes the reaction rate dependence of a chemical reaction on the absolute temperature, and other constants of the reaction, and is expressed as:

$$k=Ae^{(-Ea/RT)}$$

where K is the rate constant, T is the absolute temperature, A is a known constant for the chemical reaction, Ea is the activation energy for the chemical reaction, and R is the universal gas constant. Other formulations are based on the Boltzmann constant, but also exhibit this exponential form. The Arrhenius equation gives the quantitative basis of the relationship between the activation energy and the rate at which a chemical reaction proceeds. This creates the basis for combining environmental conditions (e.g., temperature) and time to create a time response of an object exposed to the conditions. Other aging/time response models tend to have a similar exponential type equation, including such models for non-chemical processes. For example, the cumulative stress in rigid structures (e.g., concrete and steel) are determined by stressors such as compression and flexing over time.

Those skilled in the art will appreciate how environmental attributes can generate the aging/time response models. Further they will see how combining these models as a plurality can describe complex and heterogeneous aging/time responses for an object. For example, a concrete and steel overpass might be described by several equations showing how traffic loads, earthquakes, and chemical changes in the bridge materials combine to define the end of safe, useful light. Moving structures (e.g., trucks, railroad equipment, mining equipment) can exhibit similar changes over time.

Finally, with respect to the exemplary system architecture 1700, the various modules and associated functionalities can be realized in independent systems or integrated in various combinations. As illustrated, the object environmental response model(s) module 1750 and object aging/time-response model(s) module 1760 comprise a "digital twins cloud" and the object configuration data module 1730 and business rule(s) module 1740 comprise an "object population cloud", while the object position data module 1710 and object weather & environmental data module 1720 are independent systems. Alternative embodiments can be implanted without departing from the principles disclosed heren.

Figure 18:
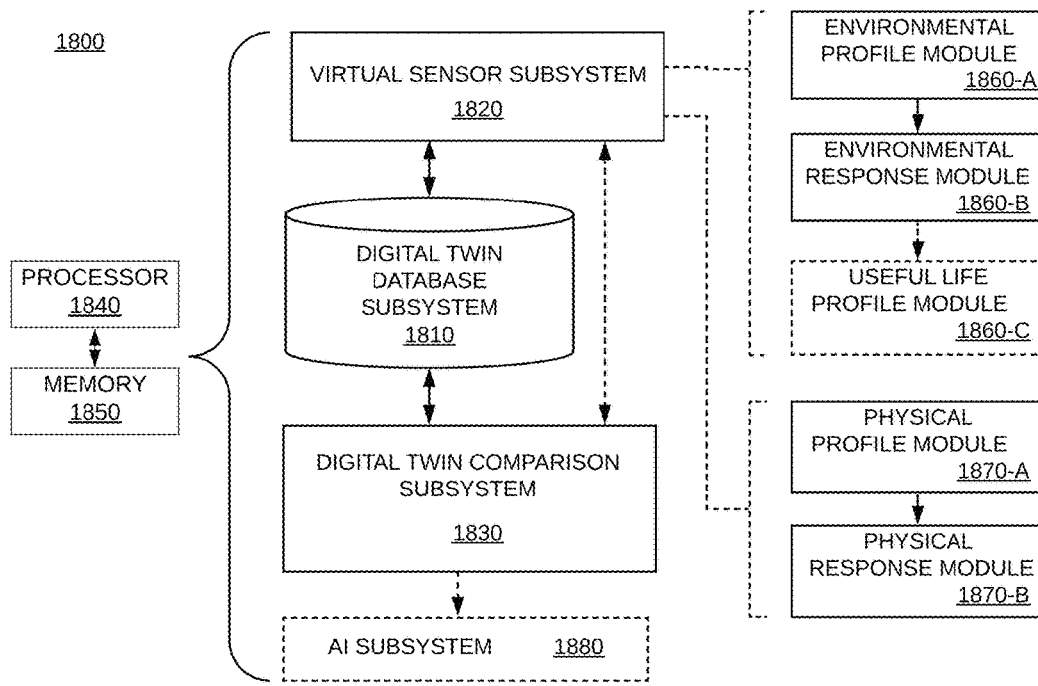
FIG. 18 illustrates an exemplary operations and maintenance (O&M) system for sensor-less digital twins; and, FIGS. 19-A, 19-B, 19-C, and 19-D illustrate exemplary methods for use in an O&M system for sensor-less digital twins.

Turning now to FIGS. 18 and 19, illustrated are an exemplary operations and maintenance (O&M) system 1800, and related methods, for sensor-less digital twins according to the principles described herein; the system and methods are characterized by the use of sensor-less digital twins for a plurality of objects. The O&M system 1800 includes: a database subsystem 1810, a virtual sensor subsystem 1820, and a digital twin comparison subsystem 1830. The O&M system 1800 can be implanted in a digital system comprising at least one processor 1840 and a memory 1850; the memory 1850 stores instructions which, when executed by the processor 1840, are operative to perform the functions of the various methods illustrated in FIG. 19. Alternatively, each of the digital twin database subsystem 1810, virtual sensor subsystem 1820, and digital twin comparison subsystem 1830 can be implemented in independent systems, each comprising at least one processor 1840 and memory 1850. Similarly, as described with reference to FIG. 17, the various subsystems can be physically hosted remotely from one or more of the plurality of unique objects. Furthermore, depending on the preferred implementation of O&M system 1800, and although illustrated as bi-directional, the communications between each of database subsystem 1810, virtual sensor subsystem 1820, and digital twin comparison subsystem 1830 can be unidirectional; such alternatives will be described hereinafter with reference to the methods illustrated in FIG. 19.

In alternative embodiments, the plurality of unique objects managed by the O&M system 1800 can be uniquely associated with a plurality of digital twin types, each digital twin type providing a different representation of an associated object. For example, a virtual representation associated with a digital twin can represent the normal functioning of an associated object, a failure mode of an associated object, or a maintenance schedule for an associated object.

The virtual sensor subsystem 1820 can include an environmental profile module 1860-A and an environmental response module 1860-B; in some embodiments, a useful life profile module 1860-C is also included. Alternatively, or in addition, the virtual sensor subsystem 1820 can include a physical profile module 1870-A and a physical response module 1870-B.

The O&M system 1800 can also include an artificial intelligence (AI) subsystem 1880, wherein the O&M system makes the operational or maintenance decision with respect to an object as a function of processing the comparison by the AI subsystem. In such embodiments, the operational or maintenance decision with respect to an object can be a function of a deviation of the comparison from a nominal value; the nominal value can be variable as a function of historical operational data from one or more of the plurality of unique objects. Alternatively, the decision can be based on a deviation from a predicted value.

Referring now to FIGS. 19-A, 19-B, 19-C and 19-D, the functionality embodied in the various elements of O&M system 1800 will be described. In a step 1910, at least at least first and second distinct digital twins are stored in digital twin database subsystem 1810 for each of a plurality of unique objects; although the objects may all be of the same type, they are each unique in some respect, due to variations in manufacture or material composition. The first and second digital twins for each of the plurality of objects is distinct in that each provides a different representation for its associated object; e.g., a representation of an as-built configuration, a representation of normal operations, or a representation of failure modes. At least one of the digital twins has an identifier, such as a serial number, that uniquely associates it with one of the plurality of unique objects and defines a unique virtual representation thereof. Another one, or further ones, of the digital twins can also have a unique identifier and also define a unique virtual representation of an object, or such additional digital twin(s) can be a generic virtual representation for a class or type of the object.

In a step 1920, operational data for ones of the plurality of objects is emulated in the virtual sensor subsystem 1820; as noted supra, the virtual sensor subsystem 1820 is not dependent on sensors physically associated with ones of the plurality of unique objects. In various embodiments, the emulation process 1920 can be based on unique operational data 1921 for an object; alternatively, or in addition, the emulation process can be based on aggregate operational data for a plurality of objects of the same class or type. Exemplary emulation processes 1923, 1924 and 1925 will be described infra with respect to FIGS. 19-B, 19-C and 19-D.

In a step 1930, digital twin comparison subsystem 1830 compares the outputs of the at least first and second distinct digital twins for each of the plurality of unique objects; the output of at least one of the first and second digital twins is a function of the emulated operational data for its associated object, and the O&M system makes an operational or maintenance decision with respect to an object as a function of the comparison.

The decision of the O&M system with respect to an object can be based on a coherent comparison of the outputs of the first and second distinct digital twins associated with the object. Alternatively, the decision can be based on a weighted comparison of the outputs of the first and second distinct digital twins; in a related embodiment, the weighted comparison can be a function of confidence values associated with each of the distinct digital twins.

In some embodiments, the operational or maintenance decision with respect to an object is made by processing the comparison result, in a step 1931, by AI subsystem 1840. In such embodiments, the operational or maintenance decision with respect to an object can be a function of a deviation of the comparison from a nominal value for the object or for the class or type of object; the nominal value can be variable as a function of historical operational data from one or more of the plurality of unique objects. Alternatively, the decision can be based on a deviation from a predicted value.

As an example of the operation and interactions of database subsystem 1810, virtual sensor subsystem 1820, and digital twin comparison subsystem 1830, the digital twin comparison subsystem 1830 can perform the comparison function by periodically querying the digital twin database subsystem 1820 for the at least first and second distinct digital twins for an object and querying the virtual sensor subsystem 1820 for emulated operational data for one or more of the distinct digital twins; in such embodiments, the communications between the digital twin comparison subsystem 1830 and both the digital twin database subsystem 1810 and virtual sensor subsystem 1820 would be bidirectional. In an alternative embodiment, the comparison could be triggered by the unrequested receipt from virtual sensor subsystem 1820 of new emulated operational data for an object; in such embodiments, the communications between those two subsystems would be unidirectional. Similarly, the comparison by digital twin comparison subsystem 1830 could be triggered by a periodic trigger from digital twin database subsystem 1810, in response to which digital twin comparison subsystem 1830 would query virtual sensor subsystem 1820 for current emulated operational data for an object; in such an embodiment, the periodic trigger could be a unidirectional communication while the query/response between the digital twin comparison subsystem 1830 and virtual sensor subsystem 1820 would be bi-directional. Other alternative embodiments can be conceived and are intended to be within the scope of the claims.

Turning now to FIGS. 19-B, 19-C, and 19-D, illustrated are the exemplary emulation processes 1923, 1924 and 1925 referenced in FIG. 19-A. As noted supra, the virtual sensor subsystem 1820 can include an environmental profile module 1860-A and environmental response module 1860-B. As illustrated in FIG. 19-B, the environmental profile module 1860-A, in step 1923-A, estimates one or more environmental factors that can affect ones of the plurality of unique objects. The environmental response module 1860-B then generates, in step 1923-B, emulated operational data for ones of the plurality of unique objects as a function of each object's exposure to the one or more environmental factors. In some embodiments, the virtual sensor subsystem 1820 can further include a useful life profile module 1860-C; in such embodiments, as illustrated in FIG. 19-C, a remaining useful life for ones of the plurality of unique objects is estimated, in step 1924-B, as a function of each objects associated one or more degradation values 1924-A. To estimate the one or more environmental factors, the environmental profile module 1860-A can receive position and environmental data for ones of the plurality of unique objects, wherein position data defines the current or one or more historical physical locations for an object and the environmental data comprises environmental measurements associated with those physical locations; the position and environmental data for an object can be obtained from one or more systems independent from the object.

As noted supra, the virtual sensor subsystem 1820 can alternatively, or in addition, include a physical profile module 1870-A and physical response module 1870-B. As illustrated in FIG. 19-D, the physical profile module 1870-A, in step 1925-A, estimates one or more physical factors that can affect ones of the plurality of unique objects. The physical response module 1870-B then generates, in step 1925-B, emulated operational data for ones of the plurality of unique objects as a function of each object's exposure to the one or more physical factors.

The emulated operational data can also be a function of an estimated rate of chemical reaction. For example, as described supra, an estimated rate of chemical reaction can be based on the Arrhenius equation.

In some embodiments, the virtual sensor subsystem 1820 receives, as input to step 1920, unique operational data 1921, for each instance of an object. Alternatively, or in addition to such unique operational data, the virtual sensor subsystem 1820, can aggregate emulated operational data 1922 for similar ones of the plurality of unique objects. In such embodiments, the output of a digital twin, utilized in step 1930, can be a function of the aggregate emulated operational data for similar ones of the plurality of unique objects. The operational or maintenance decision of the O&M system with respect to an object can also be a function of the aggregate emulated operational data for similar ones of the plurality of unique objects.

The foregoing has described various embodiments of O&M systems, and related methods, for objects having virtual representations ("digital twins") thereof; and, more particularly, to O&M systems and methods for sensor-less digital twins. The disclosed systems and methods are provided to illustrate the essential and optional features and functions, and those skilled in the art may conceive of alternatives or modifications that do not depart from the principles of the invention as encompassed by the appended claims, and that such alternatives or modifications may be functionally equivalent.

We claim:

1. An operations and maintenance, O&M system for a plurality of unique objects, said O&M system comprising:
a database subsystem for storing at least first and second distinct digital twins for each of said plurality of unique objects, at least one of said digital twins having an identifier that uniquely associates said identifier with one of said plurality of unique objects and defining a unique virtual representation thereof, at least one of said digital twins being associated with a sub-element of an associated object;
a virtual sensor subsystem operative to emulate operational data for ones of said plurality of unique objects, said virtual sensor subsystem not dependent on sensors physically associated with said ones of said plurality of unique objects; and, a digital twin comparison subsystem operative to compare outputs of said at least first and second distinct digital twins for each of said plurality of unique objects, wherein said output of at least one of said first and second digital twins is a function of said emulated operational data for said associated unique object, wherein said O&M system makes an operational or maintenance decision with respect to at least one of said plurality of unique objects as a function of said comparison.

2. The O&M system recited in claim 1, wherein said virtual sensor subsystem comprises:
an environmental profile module for estimating one or more environmental factors that can affect ones of said plurality of unique objects; and,
an environmental response module for generating said emulated operational data for ones of said plurality of unique objects as a function of said unique objects' exposure to said one or more environmental factors.

3. The O&M system recited in claim 2, wherein said environmental profile module receives position and environmental data for ones of said plurality of unique objects, wherein said position data defines one or more historical physical locations for said unique objects and said environmental data comprises environmental measurements associated with each of said one or more historical physical locations.

4. The O&M system recited in claim 3, wherein said position data for said unique object is obtained from a system independent from said unique object.

5. The O&M system recited in claim 3, wherein said environmental data for said unique object is obtained from a system independent from said unique object.

6. The O&M system recited in claim 2, wherein said emulated operational data comprises one or more degradation values.

7. The O&M system recited in claim 6, further comprising a useful life profile module for estimating a remaining useful life for ones of said plurality of unique objects as a function of each unique objects' associated one or more degradation values.

8. The O&M system recited in claim 2, wherein said emulated operational data is a function of an estimated rate of chemical reaction.

9. The O&M system recited in claim 8, wherein said estimated rate of chemical reaction is based on an Arrhenius equation, $k=[Ae]^{(-Ea/RT)}$, wherein k is a rate constant, T is an absolute temperature, A is a known constant for said chemical reaction, Ea is an activation energy for said chemical reaction, and R is a universal gas constant.

10. The O&M system recited in claim 1, wherein said virtual sensor subsystem comprises:
a physical profile module for estimating one or more physical factors that can affect ones of said plurality of unique objects; and,
a physical response module for generating said emulated operational data for ones of said plurality of unique objects as a function of said unique objects' exposure to said one or more physical factors.

11. The O&M system recited in claim 1, wherein said virtual sensor subsystem stores unique operational data for each instance of said unique object.

12. The O&M system recited in claim 1, wherein said virtual sensor subsystem aggregates emulated operational data for similar ones of said plurality of unique objects.

13. The O&M system recited in claim 12, wherein said output of said digital twin is a function of said aggregate emulated operational data for said similar ones of said plurality of unique objects.

14. The O&M system recited in claim 12, wherein said operational or maintenance decision of said O&M system with respect to said unique object is a function of said aggregate emulated operational data for said similar ones of said plurality of unique objects.

15. The O&M system recited in claim 1, wherein ones of said plurality of unique objects are uniquely associated with a plurality of digital twin types, each digital twin type providing a different representation of said associated unique object.

16. The O&M system recited in claim 1, wherein a virtual representation associated with said digital twin comprises a representation of a normal functioning of an associated unique object.

17. The O&M system recited in claim 1, wherein a virtual representation associated with said digital twin comprises a representation of a failure mode of an associated unique object.

18. The O&M system recited in claim 1, wherein a virtual representation associated with said digital twin comprises a maintenance schedule for an associated unique object.

19. The O&M system recited in claim 1, wherein one or more of said database subsystem, said virtual sensor subsystem, and said digital twin comparison subsystem are physically hosted remotely from said plurality of unique objects.

20. The O&M system recited in claim 1, wherein said operational or maintenance decision is based on a coherent comparison of said outputs of said first and second distinct digital twins.

21. The O&M system recited in claim 1, wherein said operational or maintenance decision is based on a weighted comparison of said outputs of said first and second distinct digital twins.

22. The O&M system recited in claim 21, wherein said weighted comparison is a function of confidence values associated with said outputs of each of said first and second digital twins.

23. The O&M system recited in claim 1, further comprising an artificial intelligence, AI subsystem, wherein said O&M system makes said operational or maintenance decision with respect to said unique object as a function of processing said comparison by said AI subsystem.

24. The O&M system recited in claim 23, wherein said operational or maintenance decision with respect to an object is a function of a deviation of said outputs of said comparison from a nominal value.

25. The O&M system recited in claim 24, wherein said nominal value is variable as a function of historical operational data from one or more of said plurality of unique objects.

26. A method for use in an operations and maintenance, O&M system for a plurality of unique objects, said method comprising:
storing at least first and second distinct digital twins for each of said plurality of unique objects, at least one of said digital twins having an identifier that uniquely associates said identifier with one of said plurality of unique objects and defining a unique virtual representation thereof, at least one of said digital twins being associated with a sub-element of an associated object;
emulating operational data for ones of said plurality of unique objects, said emulated operational data not dependent on sensors physically associated with said ones of said plurality of unique objects; and, comparing outputs of said at least first and second distinct digital twins for each of said plurality of unique objects, wherein said output of at least one of said first and second digital twins is a function of said emulated operational data for said associated unique object, whereby said O&M system can make an operational or maintenance decision with respect to at least one of said plurality of unique objects as a function of said comparison.

27. The method recited in claim 26, wherein said step of emulating comprises:
estimating one or more environmental factors that can affect ones of said plurality of unique objects; and,
generating said emulated operational data for ones of said plurality of unique objects as a function of said unique objects' exposure to said one or more environmental factors.

28. The method recited in claim 27, further comprising receiving position and environmental data for ones of said plurality of unique objects, wherein said position data defines one or more historical physical locations for said unique objects and said environmental data comprises environmental measurements associated with each of said one or more historical physical locations.

29. The method recited in claim 28, wherein said position data for said unique object is obtained from a system independent from said unique object.

30. The method recited in claim 28, wherein said environmental data for said unique object is obtained from a system independent from said unique object.

31. The method recited in claim 27, wherein said emulated operational data is a function of an estimated rate of chemical reaction.

32. The method recited in claim 31, wherein said estimated rate of chemical reaction is based on an Arrhenius equation, $k=[Ae]^{(-Ea/RT)}$, wherein k is a rate constant, T is an absolute temperature, A is a known constant for said chemical reaction, Ea is an activation energy for said chemical reaction, and R is a universal gas constant.

33. The method recited in claim 26, wherein said step of emulating comprises:
estimating one or more physical factors that can affect ones of said plurality of unique objects; and,
generating said emulated operational data for ones of said plurality of unique objects as a function of said unique objects' exposure to said one or more physical factors.

34. The method recited in claim 27, wherein said emulated operational data comprises one or more degradation values.

35. The method recited in claim 34, wherein said step of emulating comprises estimating a remaining useful life for ones of said plurality of unique objects as a function of each unique objects' associated one or more degradation values.

36. The method recited in claim 26, wherein said emulated operational data is a function of unique operational data for each instance of said unique object.

37. The method recited in claim 26, wherein said emulated operational data is a function of aggregate emulated operational data for similar ones of said plurality of unique objects.

38. The method recited in claim 37, wherein said output of said digital twin is a function of said aggregate emulated operational data for said similar ones of said plurality of unique objects.

39. The method recited in claim 37, wherein said operational or maintenance decision of said O&M system with respect to said unique object is a function of said aggregate emulated operational data for said similar ones of said plurality of unique objects.

40. The method recited in claim 26, wherein ones of said plurality of unique objects are uniquely associated with a plurality of digital twin types, each digital twin type providing a different representation of said associated unique object.

41. The method recited in claim 26, wherein a virtual representation associated with said digital twin comprises a model of a normal functioning of an associated unique object.

42. The method recited in claim 26, wherein a virtual representation associated with said digital twin comprises a representation of a failure mode of an associated unique object.

43. The method recited in claim 26, wherein a virtual representation associated with said digital twin comprises a maintenance schedule for an associated unique object.

44. The method recited in claim 26, wherein said operational or maintenance decision is based on a coherent comparison of said outputs of said first and second distinct digital twins.

45. The method recited in claim 26, wherein said operational or maintenance decision is based on a weighted comparison of said outputs of said first and second distinct digital twins.

46. The method recited in claim 45, wherein said weighted comparison is a function of confidence values associated with said outputs of each of said first and second digital twins'.

47. The method recited in claim 26, further comprising making an operational or maintenance decision with respect to said object as a function of processing said comparison by an artificial intelligence, AI subsystem.

48. The method recited in claim 47, wherein said operational or maintenance decision with respect to an object is a function of a deviation of said outputs of said comparison from a nominal value.

49. The method recited in claim 48, wherein said nominal value is variable as a function of historical operational data from one or more of said plurality of unique objects.

* * * * *